(12) United States Patent
Duheille et al.

(10) Patent No.: US 8,237,676 B2
(45) Date of Patent: Aug. 7, 2012

(54) METHOD FOR DETERMINING THE LOCATIONS OF AT LEAST TWO IMPACTS

(75) Inventors: Remi Duheille, Rueil-Malmaison (FR); Olivier Schevin, Paris (FR); Ros Kiri Ing, Paris (FR)

(73) Assignee: Elo Touch Solutions, Inc., Menlo Park, CA (US)

( * ) Notice: Subject to any disclaimer, the term of this patent is extended or adjusted under 35 U.S.C. 154(b) by 858 days.

(21) Appl. No.: 12/339,874

(22) Filed: Dec. 19, 2008

(65) Prior Publication Data

US 2009/0195517 A1 Aug. 6, 2009

(30) Foreign Application Priority Data

Dec. 21, 2007 (EP) .................................. 07291611

(51) Int. Cl.
*G06F 3/041* (2006.01)
(52) U.S. Cl. ........................ 345/173; 345/177
(58) Field of Classification Search .................. None
See application file for complete search history.

(56) References Cited

U.S. PATENT DOCUMENTS

| | | | |
|---|---|---|---|
| 7,511,711 B2 * | 3/2009 | Ing et al. ...................... | 345/424 |
| 2005/0083313 A1 * | 4/2005 | Hardie-Bick ................ | 345/177 |
| 2005/0212777 A1 | 9/2005 | Ing et al. | |
| 2006/0279548 A1 * | 12/2006 | Geaghan ..................... | 345/173 |
| 2011/0137968 A1 * | 6/2011 | Ing ............................... | 708/201 |

FOREIGN PATENT DOCUMENTS

| | | |
|---|---|---|
| FR | 2841022 A1 | 12/2003 |
| RU | 2201618 C2 | 3/2003 |
| WO | WO-01/43063 | 6/2001 |
| WO | WO-03/067511 | 8/2003 |
| WO | WO-03/107261 | 12/2003 |
| WO | WO-2006/069596 | 7/2006 |
| WO | WO-2006/108443 | 10/2006 |
| WO | WO-2006133018 A2 | 12/2006 |

OTHER PUBLICATIONS

European Search Report for EP 07291611 dated Jun. 27, 2008.
Search Report for Eurasian Application No. 200802359 dated May 18, 2009.

* cited by examiner

*Primary Examiner* — Jason Olson
(74) *Attorney, Agent, or Firm* — Marshall, Gerstein & Borun LLP

(57) ABSTRACT

A method for determining the locations of at least two impacts $F_1$ and $F_2$ on a surface using one or more sensors $S_i$, i=1 to n, with n being the number of sensors, and the impacts $F_1$ and $F_2$ generating a signal being sensed by the one or more sensors, wherein each sensor provides a sensed signal $s_i(t)$, i=1 to n, with n being the number of sensors. To be able to determine simultaneous impacts of different amplitudes the method includes identifying the location x of one impact, and determining a modified sensed signal $s_i'(t)$ for each sensor in which the contribution due to the identified impact is reduced and which is based on a comparison, in particular a correlation, of each of the sensed signals $s_i(t)$ and a predetermined reference signal $r_{i,j}(t)$ corresponding to a reference impact $R_j$ at location j. The method can also be based on couples of sensed signals.

35 Claims, 27 Drawing Sheets

METHOD FOR DETERMINING THE LOCATIONS OF AT LEAST TWO IMPACTS

CROSS-REFERENCE TO RELATED APPLICATION

The present application claims the benefit of priority of European Patent Application No. 07291611.7, filed Dec. 21, 2007. The entire text of the priority application is incorporated herein by reference in its entirety.

FIELD OF THE DISCLOSURE

The disclosure relates to a method for determining the locations of at least two impacts on a surface using one or more sensors.

BACKGROUND

Man-machine interfaces using a haptic technology based on the recognition of sound waves propagating through an interface plate, present multiple advantages with respect to the touch control man-machine interfaces based on standard technologies, like capacitive interfaces. In particular, the material of the interface plate on which a user creates an impact, does not need to be conductive using the acoustic technology and furthermore the way the impact is created is not limited, as an acoustic sound wave can be generated by any means, e.g. being the finger tip, a gloved finger, a stylus etc.

In fact, a tap on an object produces a sound wave pattern through the material creating an acoustic signature which is unique to the location of the impact. An acoustic sensor linked to a computer or a Digital Signal Processing ("DSP") board will capture the audio vibrations within the object, generating a corresponding acoustic signature. This technology is described in WO 03_107261A2.

Up to now the technology was adapted to identify the location of one tap on the interface means at a time and to initiate the corresponding action as a function of the identified location of the tap or impact. However, modern applications are demanding man-machine interfaces having the possibility to identify the locations of multiple simultaneous inputs and/or tracking inputs corresponding to the sliding of an input means on the interface means to thereby offer more user friendliness and/or enhanced capabilities.

SUMMARY OF THE DISCLOSURE

It is therefore the object of the present disclosure to provide a method which is capable of identifying the locations of more than one impact on the interface means, and in particular for the case that the various inputs are not carried out with the same intensity.

According to the disclosure, the method for determining the locations of at least two impacts, $F_1$ and $F_2$, on a surface using one or more sensors $S_i$, $i=1$ to n, with n being the number of sensors, wherein said impacts, $F_1$ and $F_2$, are generating a signal being sensed by the one or more sensors, wherein each sensor provides a sensed signal $s_i(t)$, $i=1$ to n, with n being the number of sensors, includes the steps of a) identifying the location x of one, in particular the strongest, impact, and b) determining a modified sensed signal $s_i'(t)$ for each sensor in which the contribution due to the identified impact is reduced and which is based on a comparison, in particular a correlation, of each of the sensed signals $s_i(t)$ and a predetermined reference signal $r_{ij}(t)$.

The predetermined reference signal $r_{ij}(t)$ corresponds to the signal sensed by the sensor $s_i$ following an impact at a reference position $R_j$. Actually, prior to being capable of determining the positions of at least two impacts, the interaction surface is characterized by analyzing the signals sensed by the various sensors following a series of reference impacts provided at a certain number of reference positions $R_j$. The signals sensed by the various sensors following a series of reference impacts can, in addition, be modelled using numerical modelization approaches (ray-tracing method, finite difference method, finite element method, boundary element method, ... ).

In this context "strongest impact" comprises also the case that two or more impacts are of the same intensity. In this case the method is configured to choose one of the impacts, which in the following will be considered as representing the "strongest impact".

The comparison of the sensed signals with the reference signal can be carried out by any suitable method, like correlations including modified correlations to optimize data analysis, voice recognition, signal recognition, from recognition, neuronal networks, etc.

Instead of working in the time domain, it is of course also possible and according to the disclosure, to determine the modified sensed signal in the frequency domain which is achieved using Fourier transformation of the sensed signals and the reference signals.

The disclosed method is adapted to identify the location of the two impacts in case the impacts occur at the same time and are thus simultaneous or follow each other within a short time period, preferably in a time range from 0 to a few 10 ms.

Due to the special properties of the correlation of the sensed signals with the predetermined reference signal, it becomes indeed possible to obtain a modified sensor signal from which the influence of the identified, in particular the strongest, impact can be reduced such that the position of the second strongest impact can be determined and this even in the case that both impacts are carried out at the same time.

Preferably, step b) can comprise the steps of: correlating each of the sensed signals $s_i(t)$ with the reference signal $r_{ix}(t)$, which is the reference signal out of a plurality of reference signals $r_{ij}(t)$ which corresponds to a reference impact in the vicinity, in particular closest to the location x of the strongest impact, in particular using the Fourier transform $S_i(\omega)$ of the sensed signal $s_i(t)$ and the Fourier transform $R_{ix}(\omega)$ of the reference signal $r_{ix}(t)$, fitting each correlation product with a predetermined function, in particular a complex exponential function, and subtracting the fitted function from the correlation product.

Due to the correlation with the reference signal closest to the strongest impact, the contribution of the strongest impact to the total signal can be enhanced. Following the rules of propagation and the rules of Fourier transformation this contribution takes the form of a complex exponential function. In addition, the contributions of the other impacts which might disturb this complex exponential function, are rather small so that fitting the correlation by a complex exponential function, will allow an approximation of the contribution of the strongest signal. This approximation is then subtracted from the total signal, so that after subtraction essentially the contributions from the less strong impact/s is/are part of the remaining correlation value.

This remaining correlation value is then used to determine the position of the next strongest impact. To do so, the same method as for the strongest impact can be used. It appears that this method is also particularly adapted to situations in which the excitations of the reference impact and the real impact are the same or at least comparable. This last assumption is, in particular, valid when the distance between the real impact and the reference impact is smaller than the minimal value of the wavelength which depends on the maximal value of the operating frequency.

According to an advantageous alternative, step b) can comprise, correlating each of the Fourier transforms $S_i(\omega)$ of the sensed signals $s_i(t)$ with the Fourier transform $R_{ix}(\omega)$ of the reference signal $r_{ix}(t)$, which is the reference signal out of a plurality of reference signals $r_{ij}(t)$ which corresponds to a reference impact in the vicinity, in particular closest to the location x of the strongest impact, thereby obtaining n correlation products $S_i(\omega)R_{ix}^*(\omega)$, averaging the correlation products $S_i(\omega)R_{ix}^*(\omega)$ over the n sensors, determining the phase of the average of the n correlation products $S_i(\omega)R_{ix}^*(\omega)$, multiplying each of the correlation products $S_i(\omega)R_{ix}^*(\omega)$ with the complex conjugate of the phase of the average to thereby obtain modified correlation products, subtracting the real part from the modified correlation products, and multiplying each of the remaining part of the modified correlation products with the phase of the average.

Like in the first alternative, one takes advantage of the various correlation products using the reference signal of the strongest impact to remove its contribution to the total sensed signal. In addition to the advantages as described above, this method functions particularly well in cases, in which the form in the time domain and/or amplitude of the reference excitations and the real impacts are not comparable.

Advantageously, Step b) can further comprise multiplying the results obtained with the Fourier transform $R_{ix}(\omega)$ of the reference signal $r_{ix}(t)$ to thereby obtain a modified Fourier transform $S_i'(\omega)$ corresponding to a modified sensed signal $s_i'(t)$. Removing the contribution of the reference signal $R_{ix}(\omega)$, a modified sensed signal is obtained, that is at least similar to the signal the sensor would have sensed in case the strongest impact would not have taken place. Thus from this modified signal the next strongest impact can be determined using the standard procedure. By accomplishing this task the locations of the two strongest impacts can be readily determined.

Preferably Step a) can be comprise determining the correlations of the sensed signal $s_i(t)$ with each reference signal $r_{ij}(t)$, in particular using the Fourier transforms $S_i(\omega)$ and $R_{ij}(\omega)$, and averaging for each reference signal $r_{ij}(t)$ the correlation products over the sensors. Relating the sensed signals with each one of the reference signals will allow to identify the strongest impact as the contribution of the strongest impact will be amplified when correlated with the reference signal which is closest or in the vicinity of the strongest impact. Averaging over all sensors further facilitates the identification of the strongest impact.

According to the preferred embodiment, the above described methods can further comprise a step c) of identifying the location of the next weaker second impact using the modified sensed signals $s_i'(t)$ or its Fourier transform $S_i'(\omega)$, wherein step c) comprises determining the correlations of the modified sensed signals $s_i'(t)$ of each sensor with each reference signal $r_{ij}(t)$, in particular using the Fourier transforms $S_i'(\omega)$ and $R_{ij}(\omega)$, and averaging, preferably in the time domain, the correlation products over the sensors for each reference signal $r_{ij}(t)$. Knowing that the strongest contribution has essentially been removed, this method will allow to easily identify the next strongest impact as, like described above, the correlation with the reference signal being closest to the second strongest impact will amplify the contribution of the second strongest signal to the modified sensed signal so that its identification is made possible by looking for the maximum value of the series of correlation products. Averaging over all sensors further contributes to reliably identify the position of the next strongest impact.

With the described method it is possible to identify the second impact even if its amplitude is about less than 0.01 of the strongest impact. In addition, it is even possible to identify the second strongest impact even in case both impacts are nearly of the same intensity.

It is of particular interest to carry out the averaging in the time domain. In this regime, the summation is over the amplitudes and maxima of the average values of the correlation products diminished. Due to this, the contrast which is defined as the ratio of the correlation product with the reference signal of the position closest to the strongest impact over the mean value of the other correlation products, thus, with the reference signals of positions being further away from the strongest impact, is improved. Thus, averaging in the time domain compared to averaging in the frequency domain, where the summation is over absolute values, provides a better contrast which greatly helps in identifying weaker impacts.

Advantageously, steps a) to c) can be repeated to identify the location of the next weaker impact, wherein in each time in step a) the location of the impact which has been identified in the previous run is taken as strongest location x and in step b) a new modified sensed signal is determined out of the determined modified sensed signal of the previous run. It is therefore not only possible to identify two impacts but also a plurality of impacts, provided simultaneously, each time using the same algorithm.

The object of the disclosure is also achieved with the method that includes determining the locations of at least two impacts, F1 and F2, on a surface using one or more sensors $s_i$, i=1 to n, with n being the number of sensors, said impacts, F1 and F2, generating a signal being sensed by the one or more sensors, wherein each sensor provides a sensed signal $s_i(t)$, i=1 to n, with n being the number of sensors and which includes the steps of: a) identifying the location x of one, in particular the strongest, impact, and determining a modified signal based on the sensed signals $s_i(t)$ in which the contribution of the strongest impact is reduced and which is furthermore based on a comparison, in particular the correlation, of pairs of the sensed signals $s_i(t)$ and pairs of corresponding predetermined reference signals $r_{ij}(t)$ and $r_{ij}(t)$.

This method also allows to extract a modified signal in particular on correlations of sensed signals with reference signals. Instead of correlating signals of each sensor with reference signals, here correlations of two sensors are used. This has the advantage that, of the excitation in a time domain, of the reference excitation and the real excitation of the real impact can be different. Apart from this difference, the same advantages can be achieved with this method as compared to the one described above.

Advantageously, Step b) can comprise correlating the Fourier transforms of two sensed signals $s_i(t)$ and $s_j(t)$, thereby obtaining a first correlation product $S_i(\omega) S_j'(\omega)^*$, correlating the Fourier transforms of the corresponding reference signals $r_{ix}(t)$ and $r_{jx}(t)$, being the reference signals which correspond to a reference impact in the vicinity, in particular closest to the location of the strongest impact, thereby obtaining a second correlation product $R_{ix}(\omega) R_{jx}(\omega)^*$, and correlating the first and second correlation products to obtain a third correlation product $S_i(O) S_j'(\omega)^* R_{ix}(\omega) R_{jx}'(\omega)^*$, and averaging the real part of the third correlation product over all pairs of sensor couples and subtracting this average from the third correlation product to obtain $P_{ijx}(\omega)$. This method takes advantage of the fact that the third product, in case of two impacts, has four terms, one related to the strongest impact, one related to the weaker impact and two mixed terms. Like above, the contribution of the strongest impact shall be reduced. This is obtained by removing the average value of the real part of the third correlation product. Actually, the mixed terms are complex numbers and for the various sensors, their real part will oscillate around zero and thus, be small with respect to the contribution of the strong impact which is a purely real number. Another further assumption that, the contribution of the weaker impact due to the correlation of couples is small with respect to the contribution of the strong impact, the average of the real part can be attributed to the strongest impact. By removing this part from the third correlation product, one can therefore amplify the contributions from the weaker ones.

Advantageously, the method can further comprise a Step c) of identifying the location of the next weaker second impact comprising multiplying $P_{ii'x}(\omega)$ with the sum of $R_{ix}(o)R_{im}*(\omega)+R_{i'x}*(\omega)R_{i'm}(\omega)$ for all reference impacts r, and for all sensor couples $s_i$ and $s_{i'}$, Fourier transforming each one of the products, and summing the negative time part to the positive time part of each Fourier transform.

By carrying out these steps it becomes possible to identify the location of the next weaker impact by simply looking for which reference impact position the maximum value is obtained. This position then corresponds to the one of the second impact.

Advantageously, Step c) can further comprise averaging, preferably in the time domain, the obtained sums for all sensor couples $s_i$ and $s_{i'}$. By averaging over all sensor couples, the signal to noise ratio becomes better (see above concerning contrast) so that the identification of the weaker impact becomes possible even in case of a very low ratio between the amplitude of the weaker impact compared to the stronger impact.

According to an advantageous embodiment, Steps a) to c) can be repeated to identify the location of the next weaker impact, wherein in each time in Step a), the location of the impact which has been identified in the Step c) of the previous run is taken as the strongest location x and in Step b), a new modified signal is determined out of the determined modified signal of the previous run. Thus, not only the method can be applied to two impacts, in particular simultaneous impacts, but can be extended to even more impacts so that a multi-touch man-machine interface can be realized.

Advantageously, Step a) can comprise determining the correlations of the sensed signal $s_i(t)$ of each sensor with each reference signal $r_{ij}(t)$, in particular using the Fourier transforms $S_i(\omega)$ and $R_{ij}(\omega)$, and averaging preferably in the time domain, the correlation products over the sensors for each reference signal $r_{ij}(t)$. Relating the sensed signals with each one of the reference signals will allow to identify the strongest impact as the contribution of the strongest impact will be amplified when correlated with the reference signal which is closest or in the vicinity of the strongest impact. Averaging over all sensors further facilitates the identification of the strongest impact.

According to an alternative, step a) can comprise correlating the Fourier transforms of two sensed signals $s_i(t)$ and $s_i'(t)$ thereby obtaining the first correlation product $S_i(\omega) S_i'(\omega)*$, correlating the Fourier transforms of the reference signals $r_{im}(t)$ and $r_{i'm}(\omega)$, thereby obtaining second correlation products $R_{im}(\omega)*R_{i'm}(\omega)$, correlating the first and second correlation products to obtain the third correlation product $S_i(\omega) S_i'(\omega)*R_{im}(\omega)*R_{im}'(\omega)$, and averaging, preferably in the time domain, the correlation products over the couples of sensors $S_i$ and $S_{i'}$. Also in this way of identifying the strongest impact one takes advantage of the properties of the correlations and the position is determined by looking at the maximum value of the average over the sensors. By looking at couples of sensors and couples of reference signals, the resolution is improved.

The same method can also be used in step c) to identify the location of the next weaker impact based on the modified sensed signals.

According to an advantageous embodiment, the method can comprise determining the trajectory of a continuous impact on a surface using a method like described above. This advantage can be taken from the algorithms described above which were used to determine two impacts, e.g. at different locations but essentially simultaneous, to determining the trajectory so that also sliding of a finger on a direction surface is established.

Preferably, the first and second impacts correspond to successive positions on the trajectory. Thus, without any amendment to the method used to determine simultaneous impacts, the method is also suitable to establish the trajectory.

According to an advantage embodiment the sensor can be an acoustic sensor. In this context "acoustic sensor" means a sensor capable of sensing acoustical signals, for example, piezoelectric sensors, piezoresistive sensors, magnetostrictive sensors, capacitive displacement sensors, laser interferometric sensors, electromagneto-acoustic sensors (EMAT). It appeared that the identification of more than one impact works particularly well when acoustic signals are treated.

The disclosure also relates to a computer program product, comprising one or more computer-readable media having computer executable instructions for performing the steps of the method as described above.

The object of the disclosure is also achieved with a device for determining the locations of at least two impacts, F1 and F2, on the surface comprising: a processing unit and one or more sensors configured and arranged to transmit the sensed signal being the result of the at least two impacts to the processing unit, wherein the processing unit is configured and arranged to carry out the method according to one of claims 1 to 17. With this device, the same advantages can be achieved as for the above described methods.

BRIEF DESCRIPTION OF THE DRAWINGS

In the following the disclosure will be described further in detail in relation to the enclosed figures.

DETAILED DESCRIPTION OF THE PREFERRED EMBODIMENT

Figure 1:
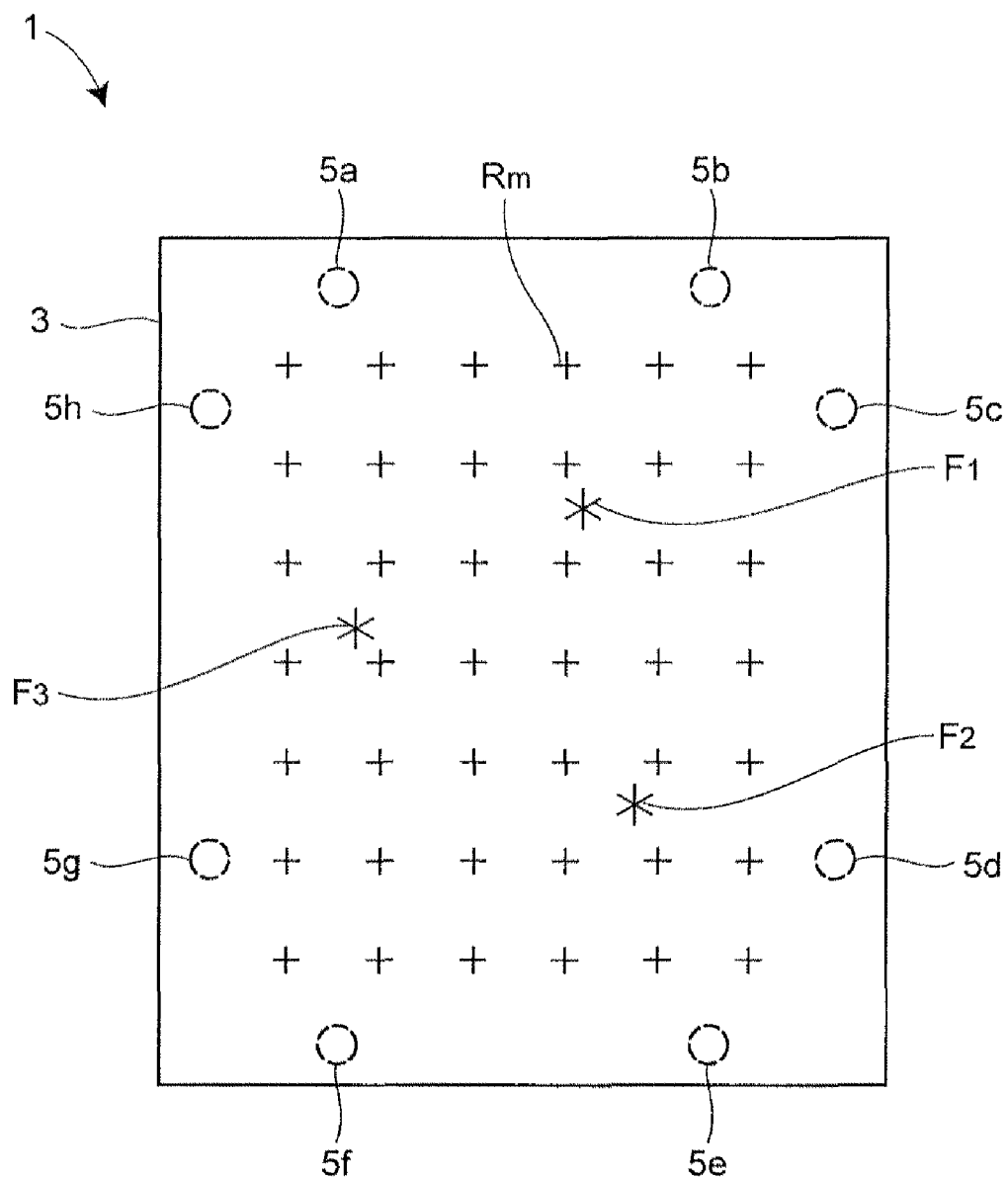
FIG. 1 schematically illustrates an interface plate and a plurality of acoustic sensors explain in detail the various embodiments of the disclosure.

FIG. 1 schematically illustrates a man-machine interface 1 comprising an interface plate 3 and a plurality of acoustic sensors 5a to 5h, here eight acoustic sensors. The outputs of the acoustic sensors 5a to 5h are connected to a processing unit (not shown) configured to analyze the signals sensed by the acoustic sensors 5a to 5h. The acoustic sensors typically comprise an electronic conditioning unit with an amplifier and a filter, and eventually analog signals are numerically converted using an Analog to Digital Converter ("ADC") before being sent to the processing unit.

This kind of man-machine interface 1 is based on the recognition of sound waves propagating through the interface plate 3 and that are sensed by the acoustic sensors 5a to 5h. It finds its application in many kind of devices, like automatic vending machines, personal computers, interfaces of industrial machines, interfaces for home appliances or any other device or situation needing a man-machine interface to provide an input to a device. As the identification of the input is based on acoustic waves, the material of the interface plate 3 can be any material or material mix through which acoustic waves can propagate, like glass, plastic plates or wood. Furthermore, the shape of the interface plate 3 does not have to be rectangular as illustrated, but can be of any form, for instance be of a curved shape.

The acoustic sensors 5a-5h used are of the piezoelectric sensor type. However, other kind of pressure sensitive sensors might also be used, like for example piezoresistive sensors, magnetostrictive sensors, capacitive displacement sensors, laser interferometric sensors, electromagneto-acoustic sensors (EMAT). In the illustrative arrangement of FIG. 1 eight acoustic sensors 5a to 5h are used, however, depending on the accuracy needed or the size of the man-machine interface 1 more or less acoustic sensors may be used. In the configuration illustrated, the acoustic sensors 5a to 5h are drawn in dotted lines to indicate that they are arranged on the back side of the interface plate 3, with the front side being the one upon which a user can provide an impact, e.g. by using his fingertip, or a gloved finger or a stylus, etc. The man-machine interface 1 is nevertheless not restricted to this special configuration. It is also according to the disclosure to arrange at least some of the sensors 5a to 5h on the surface side of the interface plate 3 upon which the impacts occur.

In FIG. 1, the stars "*" illustrate the locations of three impacts $F_1$, $F_2$ and $F_3$. It is the merit of this disclosure to provide methods to determine the locations of these impacts even in case they occur simultaneously and/or as a consequence of a sliding on the interface plate 3. The disclosure is nevertheless not restricted to the identification of three impacts $F_1$-$F_3$, but depending on the available computational power can be extended to more than three impacts or to only two.

Each impact $F_j$ is characterized by an excitation function $e_j(t)$ and each sensor $S_i$ has an intrinsic response function $c_i(t)$, with "t" representing time. The function linking the excitation located at impact $F_j$ to the sensing position of sensor $S_i$ is defined as $h_{ij}(t)$. With these definitions the response of the sensor $S_i$ to a simultaneous excitation or a quasi simultaneous excitation (e.g. within a time delay from 0 to a few 10 ms) due to impacts $F_j$ with j=1–M (in the situation illustrated in FIG. 1 M=3) can be written as:

$$s_i(t) = \sum_{j=1}^{M} c_i(t) * h_{ij}(t) * e_j(t - \tau_j) \qquad (1)$$

Here the star sign "*" represents a convolution product. In the following, in order to simplify the equations, the description will be made in the frequency domain where convolution products become simple multiplication products. Nevertheless for all embodiments the necessary data treatment can of course also be carried out in the time domain without departing from the scope of the disclosure. In this case, equation 1 can be rewritten as:

$$s_i(\omega) = \sum_{j=1}^{M} C_i(\omega) H_{ij}(\omega) E_j(\omega) e^{-j\omega \tau_j} \qquad (2)$$

here the term "j" in the exponential function represents the square root of −1. $S_i(\omega)$, $C_i(\omega)$, $H_{ij}(\omega)$ and $E_j(\omega)$ are the Fourier transformations of $s_i(t)$, $c_i(t)$, $h_{ij}(t)$ and $e_j(t)$ respectively. "$\omega$" represents the angular frequency. "$\tau_j$" is the time delay of the excitation function of the j-th impact.

The localization of the position of an acoustic impact $F_j$ by the embodiments as described further below, is based on correlations of the signals $S_k(\omega)$ sensed by each acoustic sensor $S_i$ with reference signals $R_{km}(\omega)$, which are the Fourier transformations of reference signals $r_{km}(t)$ in the time domain. The reference signals $r_{km}(t)$ are determined in advance either experimentally or by a numeric modelization. In fact $r_{km}(t)$ corresponds to the reference signal sensed by the acoustic sensor $S_k$ following a reference impact at position $R_m$ (m=1 to P). In FIG. 1 a series of such reference positions are indicated by the "+" sign and carrying the reference $R_m$. The reference signal $R_{km}$ in the frequency domain can be expressed in the following way (using the same terminology as for the sensed signals):

$$R_{km}(\omega) = C_k(\omega) H_{km}(\omega) E'_m(\omega) \qquad (3)$$

The excitation term $E'_m(\omega)$ can be different to the one of equation (2), as the excitation of the reference impact and the one of the real impacts ($F_1$, $F_2$ or $F_3$) do not necessarily have to be the same.

When correlating the expressions of equations 2 and 3, wherein i=k, one obtains:

$$S_i(\omega)R_{im}^*(\omega) = \sum_{j=1}^{M} C_i(\omega)H_{ij}(\omega)E_j(\omega)e^{-j\omega\tau_j}C_i^*(\omega)H_{im}^*(\omega)E_m'^*(\omega) \quad (4)$$

$$= \sum_{j=1}^{M} C_i(\omega)C_i^*(\omega)H_{ij}(\omega)H_{im}^*(\omega)E_j(\omega)E_m'^*(\omega)e^{-j\omega\tau_j}$$

$$= \sum_{j=1}^{M} |C_i(\omega)|^2 H_{ij}(\omega)H_{im}^*(\omega)E_j(\omega)E_m'^*(\omega)e^{-j\omega\tau_j}$$

Under the assumption that the total surface has been characterised using reference impacts $R_m$, one obtains for an impact F realized at a position corresponding to the location of reference impact $R_n$, the following correlation with the reference signal obtained by that reference impact at position $R_n$:

$$S_i(\omega)R_{in}^*(\omega) = |C_i(\omega)|^2|H_{in}(\omega)|^2 E_n(\omega)E_n'^*(\omega)e^{-j\omega\tau_n} + \quad (5)$$

$$\sum_{j=1,j\neq n}^{M} |C_i(\omega)|^2 H_{ij}(\omega)H_{in}^*(\omega)E_j(\omega)E_n'^*(\omega)e^{-j\omega\tau_j}$$

In the time domain, the first term of equation 5 has a correlation maximum at time $t=\tau_n$, which is particular pronounced in case the reference and impact excitations are at least similar in time, $E_n \approx E'_n$. In case they are different, the maximum value will be less pronounced.

The sum of the second term provides a correlation having secondary maxima, the values of which depend essentially on the nature of the acoustic propagation in the interface plate 3. Depending on the symmetries of the material used, these second maxima can be relatively important, however, the impact on the maxima of the first term is neglectable.

Preferably, to improve the localization of impacts, the signals are normalized in the frequency domain so that the spectral amplitudes have a value of 1 and all the information is carried by the phase. In this case, the autocorrelation of the signal with the spectral amplitude of 1 gives a correlation maximum of 1. The intercorrelation of different signals of unitary spectral amplitudes in turn has a correlation maximum of less than 1. By doing so, one gets rid of the dependency of the correlation maximum of spectral zone/s where the spectral amplitude is high, so that actually other spectral ranges which in terms of localization information are as important but where the amplitude is lower, can advantageously be taken into account.

Figure 2:
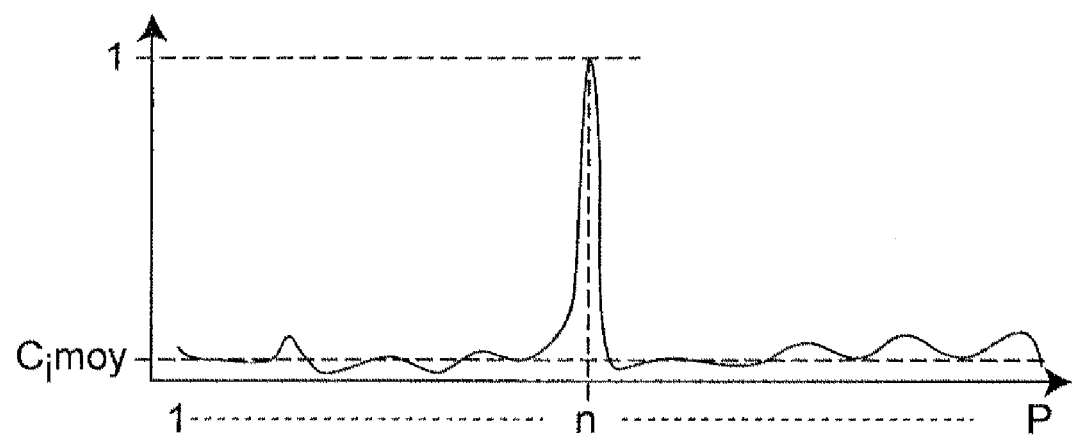
FIG. 2 illustrates the maxima of the correlation function of sensed signals with predetermined reference signals.

FIG. 2 illustrates the maxima of the correlation functions for each reference impact $R_m$ (as shown in FIG. 1, m=1 to P), for one acoustic sensor $S_i$ of the series of acoustic sensors 5a-5h, under the assumption that only one impact occurred at a position identical to the one of the reference impact at position $R_n$. The values are obtained from equation 4, for M (the number of impacts) being equal to 1 and correspond to the maxima in the time domain of the correlation product obtained with the inverse Fourier transform of equation 4 for all predetermined reference signals $r_{im}$ (with subscript i corresponding to the acoustic sensor in question).

FIG. 2 clearly indicates that the maximum of the maxima of the correlation functions is obtained for reference position $R_n$. In other words the localization of the maximum indicates the location of the impact F on the interface plate 3.

However, also the values of the maxima of the correlation functions of the other reference positions $R_m$ (with m≠n) plays a roll. In particular, the mean value of the maxima of the correlation functions $C_{i\text{-}av}$ (where i again is representing the acoustic sensor $S_i$ in question) of reference positions other than reference position $R_n$ plays a role in case the localization of two or more simultaneous impacts have to be analysed. The value of $c_{i\text{-}av}$ strongly depends on the time duration of the signals, and is the lower the longer the duration of the impact.

The use of more than one acoustic sensor (like 8 in the situation illustrated in FIG. 1) allows to improve the resolution and the reliability of the localization. When a plurality of acoustic sensors are used to localise one impact, two possibilities exist to combine the correlation results. First of all the correlation results $C_i$ with i=1 to n (the n acoustic sensors $S_i$) can be averaged in the frequency domain or in the time domain following an inverse Fourier transformation of the correlation products of equation 5 for all of the reference signals are $R_{im}$ (m=1 to P).

In the first case, the contrast which is defined as being the ratio between the maximum value of the correlation products (see FIG. 2) and the average value $C_{i_{av}}$, remains constant as a summation of absolute values is carried out. In the second case, the summation is over amplitude and the maxima of the averages of the correlation products in the time domain diminish. Thus, using this second way of averaging (in the following called averaging in the time domain), an improved contrast is achieved when the results of a plurality of acoustic sensors are combined.

Figure 3:
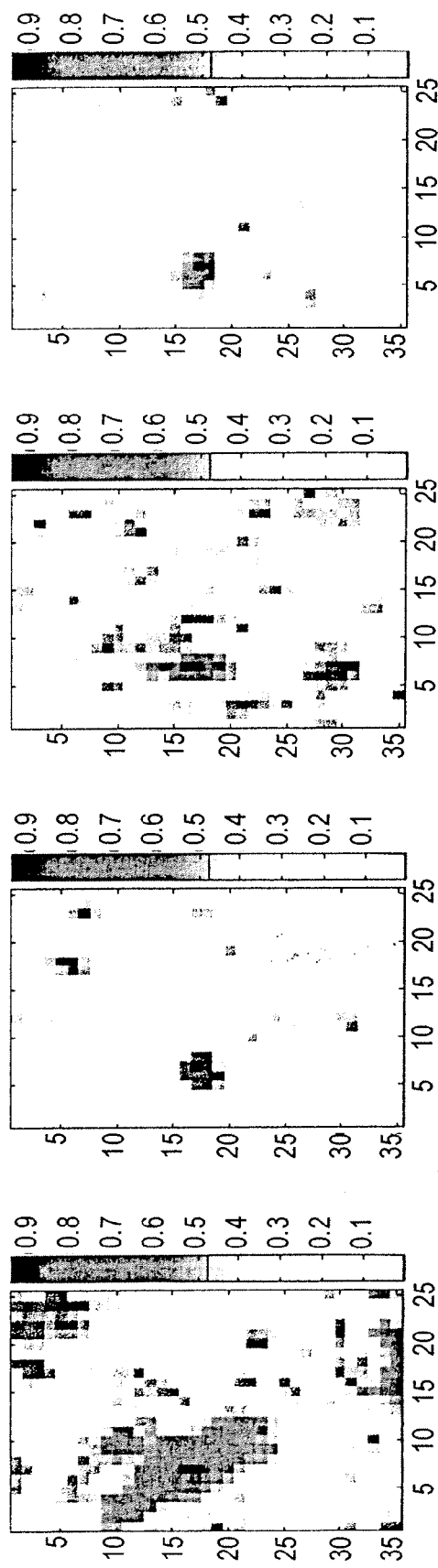
FIG. 3 illustrates the maxima of the correlation functions in an example useful for the understanding of the disclosure for eight different acoustic sensors, FIG. 4 the effect of averaging the results as obtained in FIG. 3 on the contrast.
Figure 3:
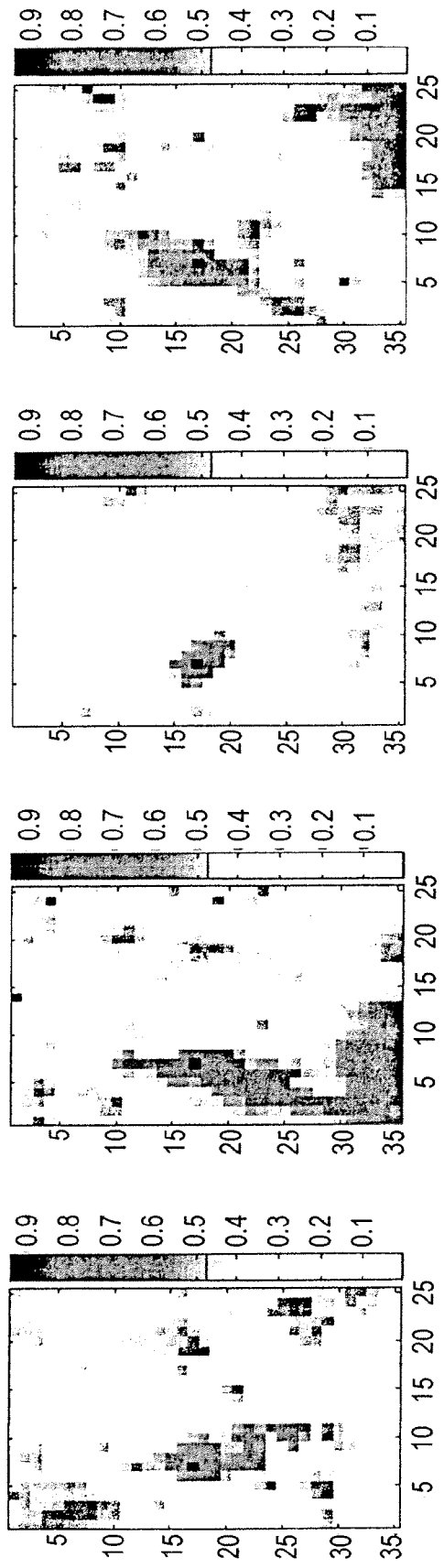

FIG. 3 illustrates experimental results of the above described process steps in the case of a single impact F on the interaction plate 3. The results were obtained for a glass plate (as interaction plate 3) of dimensions 400×300×4.5 mm³ using eight acoustic sensors (here piezoelectric sensors) arranged like illustrated in FIG. 1, namely two sensor close to each edge and arranged on the back side of the interaction plate with respect to the side of the impact. Reference impacts $R_m$ were determined over the entire surface of the glass plate with a sampling step of 10 mm in both directions. The sampling rate was of 48 kHz with a precision of 12 bits.

Figure 4:
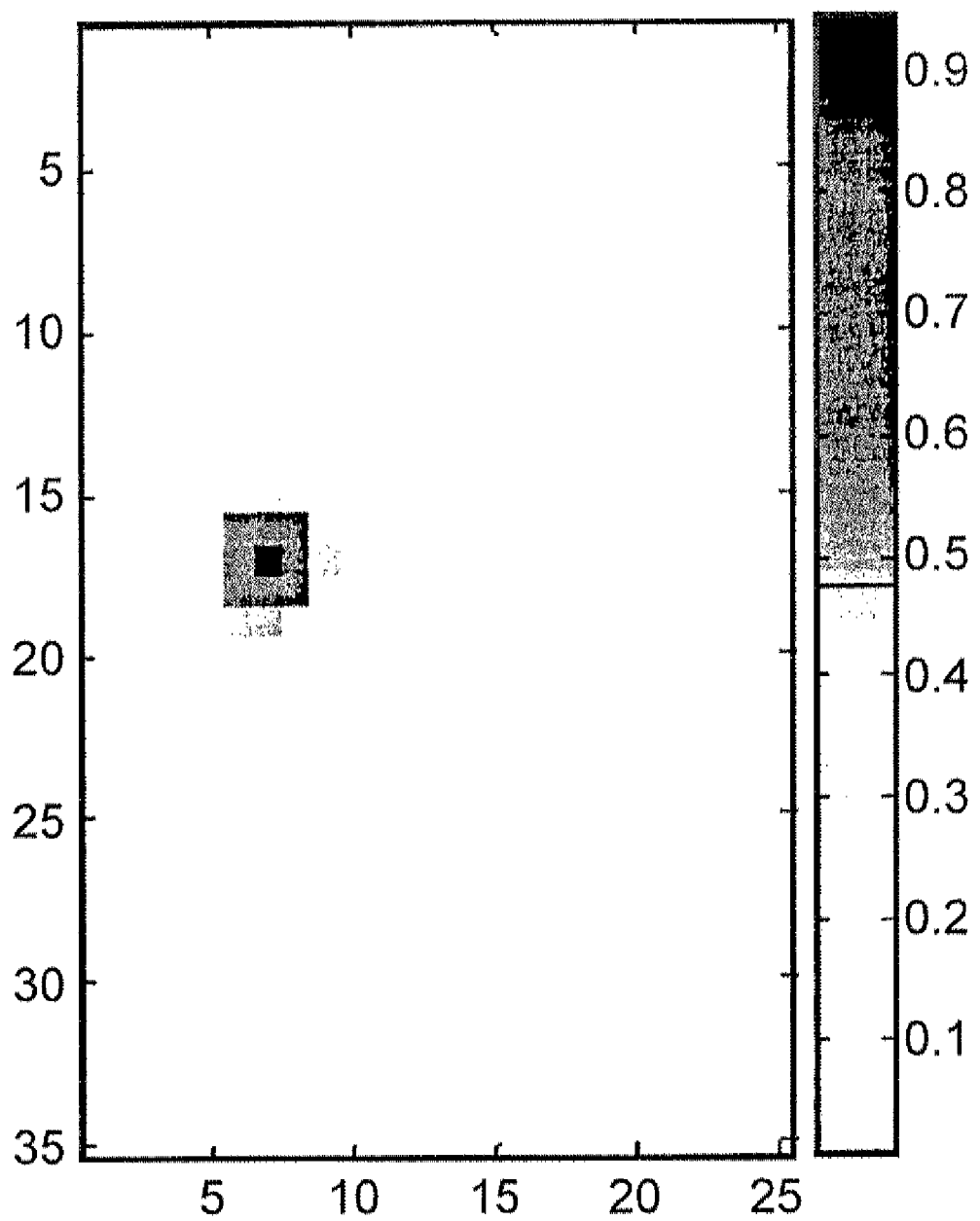

FIG. 3 illustrates, for an impact close to the center of the glass plate (interface plate 3), the correlations of the sensed signals $S_i(\omega)$ with all reference signals $R_{im}(\omega)$ for each one of the eight acoustic sensors $S_i$. The contrast observed in this experimental situation was about 2.4. With the average value, illustrated in FIG. 4, of the eight acoustic sensors using averaging in the time domain, an improved contrast of about 5.7 and an even clearer identification of the position of the impact is obtained.

As already indicated the contrast, also in the experimental conditions, improves with a growing number of acoustic sensors. In the described experimental conditions for two sensors a contrast of 3.7, for four sensors a contrast of 4.8 and for eight sensors the already mentioned contrast of 5.7 have been observed.

Figure 5A:
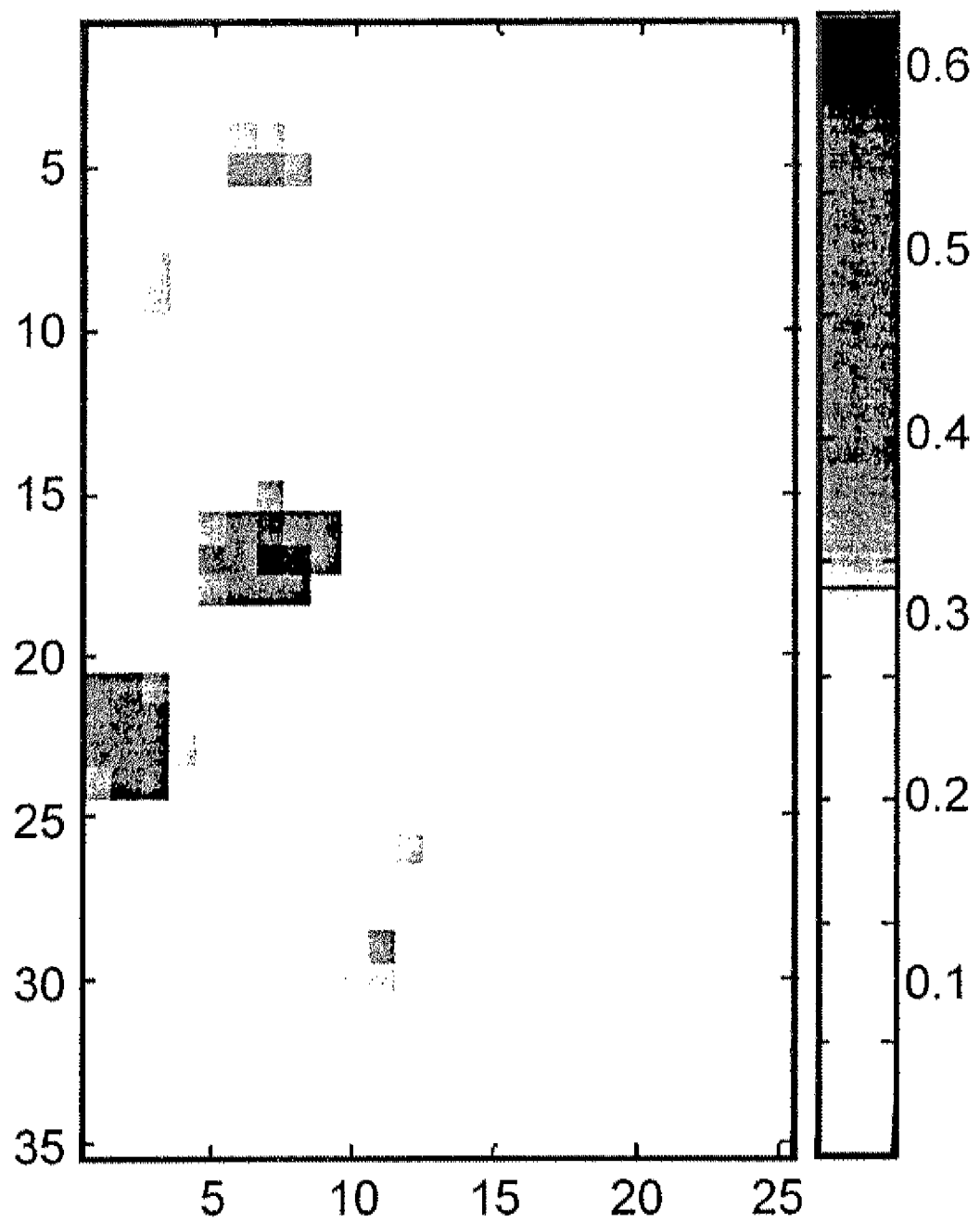
FIGS. 5a to 5d illustrate correlation maxima in case of two impacts for various amplitude ratios.
Figure 5B:
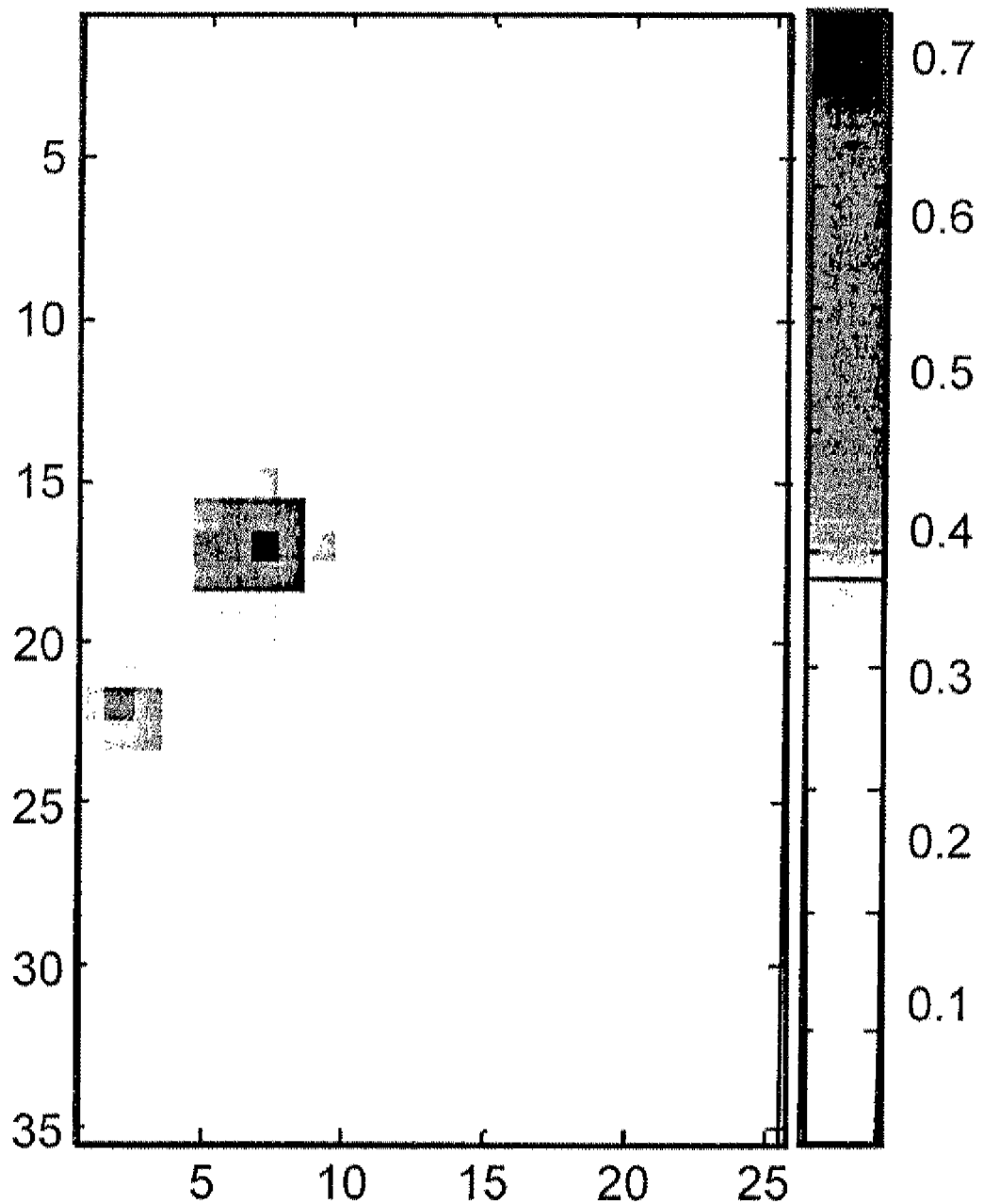
Figure 5C:
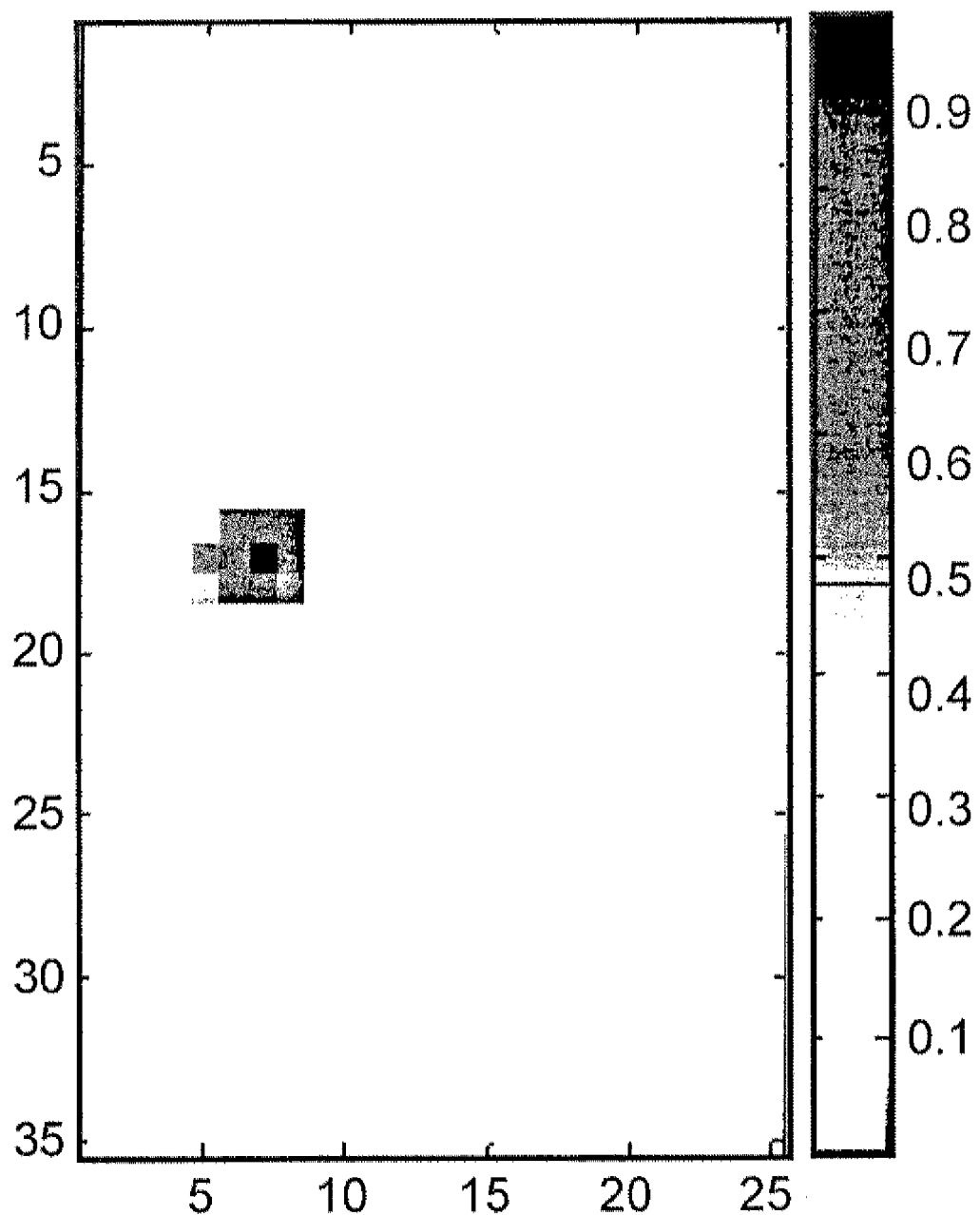
Figure 5D:
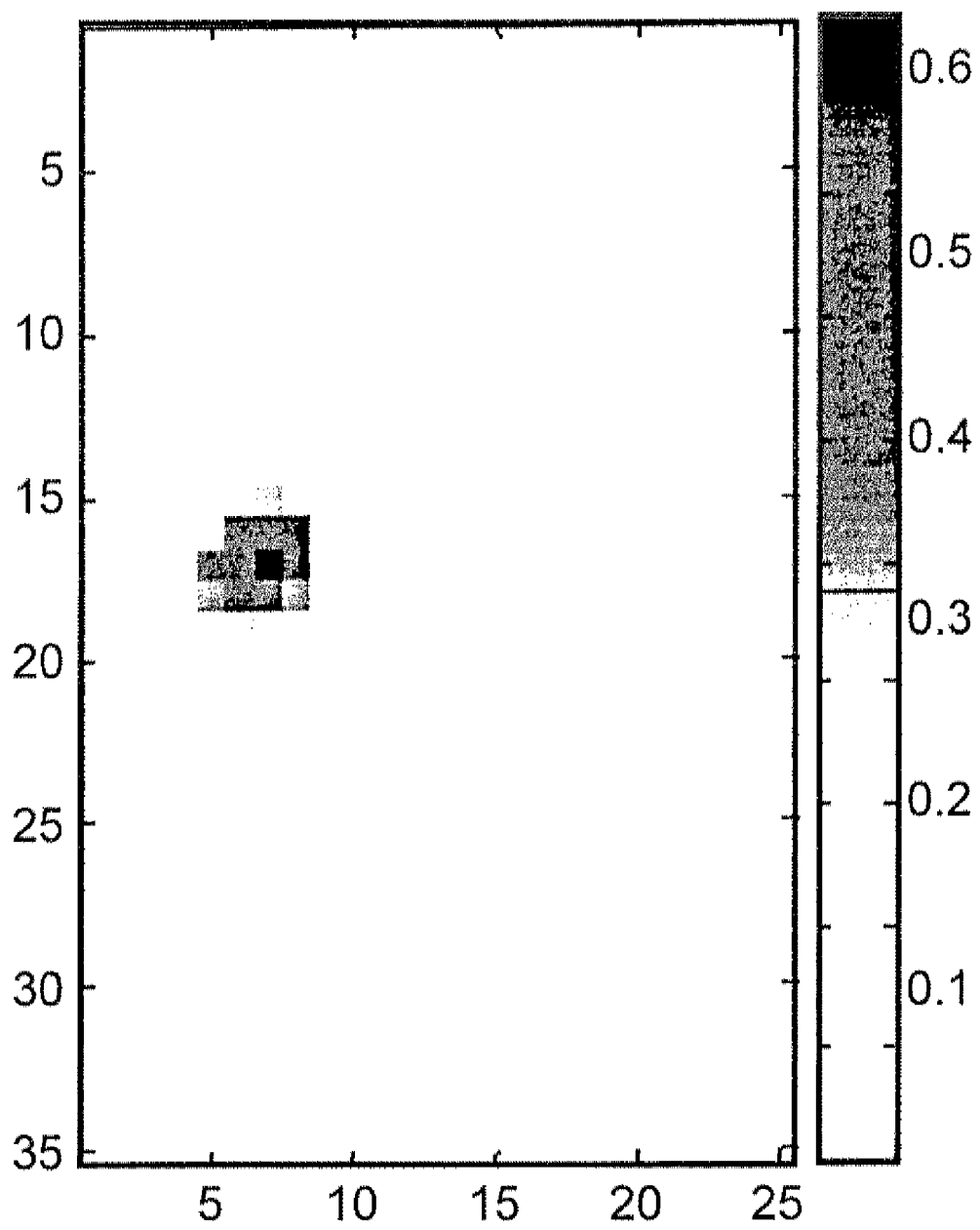

In the following the situation when more than one impact occur on the interface plate 3 will be described. FIGS. 5a-5d illustrate the average value of the maxima of the correlation products of the sensed signals $S_i(\omega)$ with all the reference signals $R_{im}(\omega)$ in the case of two simultaneous impacts. FIG. 5a shows the result in case the ratio between the excitation amplitudes of the two impacts is equal to 1, FIG. 5b the situation when the ratio is equal to 0.7, FIG. 5c the situation when the ratio is equal to 0.3 and FIG. 5d the situation when the ratio is equal to 0.1. Whereas the situation in FIGS. 5a and 5b still provides the possibility to identify the location of the two impacts, namely the two positions on the lower left side showing two individual maxima, based on the correlation products of equation 4 and 5, the identification of the position of the weaker impact is no longer possible in the situation where the ratio of the amplitudes of the two impacts exceeds a certain threshold, like illustrated in FIGS. 5c and d only showing one maximum at the location of the strongest impact.

Actually, in case the difference between the amplitudes of the impacts is important, the correlation maximum of the weaker impact is so low that it reaches the value of the above-defined average value $Ci_{av}$, and thus becomes drowned in the background.

First Embodiment

Figure 6:
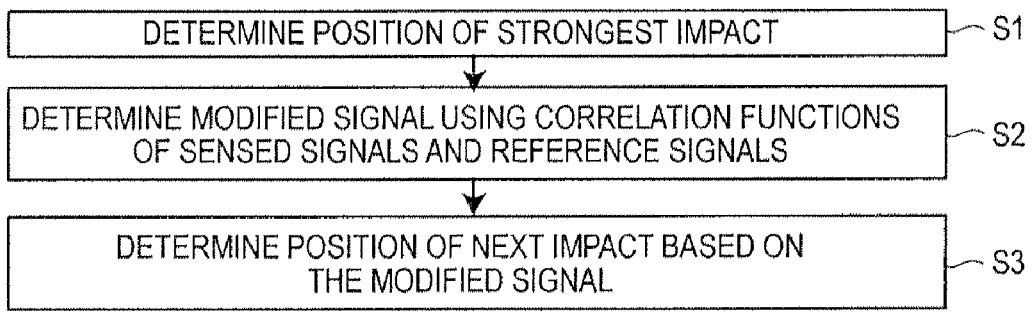
FIG. 6 illustrates the first embodiment of the disclosure.

FIG. 6 illustrates a first embodiment of a disclosed method for determining the locations of at least two impacts $F_1$ and $F_2$ on a surface, here the interface plate 3, using one or more acoustic sensors $S_i$, i=1 to n, with n being the number of acoustic sensors and which overcomes the above mentioned problem.

Step S1 includes identifying the location x of one impact. In this embodiment the strongest impact is identified, however the disclosure is not limited to the identification of the strongest impact. According to the first embodiment, step S1, corresponding to step a) in claim 1, comprises, like already described in detail above, determining the correlations of the signals $s_i(t)$ sensed by each one of the acoustic sensors 5a-5h with each one of the reference signals $r_{ij}(t)$, in particular using the respective Fourier transforms $S_i(\omega)$ and $R_{ij}( )$ to facilitate the calculation. Step S1 then furthermore comprises averaging, preferably in the time domain, the correlation products over the acoustic sensors $S_i$ for each one of the reference signals $r_{ij}(t)$. These method steps lead to the data illustrated in FIGS. 5a-5d. The location x of the strongest impact on the interface place 3 is then determined by identifying the maximum value of the average correlation maxima.

Step S2, corresponding to step b) of claim 1, of the first embodiment of the disclosure comprises determining a modified sensed signal $s_i'(t)$ for each acoustic sensor $S_i$ in which the contribution due to the strongest impact at location x is reduced. This step is based on a correlation of each one of the sensed signals $s_i(t)$ and the predetermined reference signal $r_{ij}(t)$ corresponding to the reference impact at location $R_j$.

Figure 7:
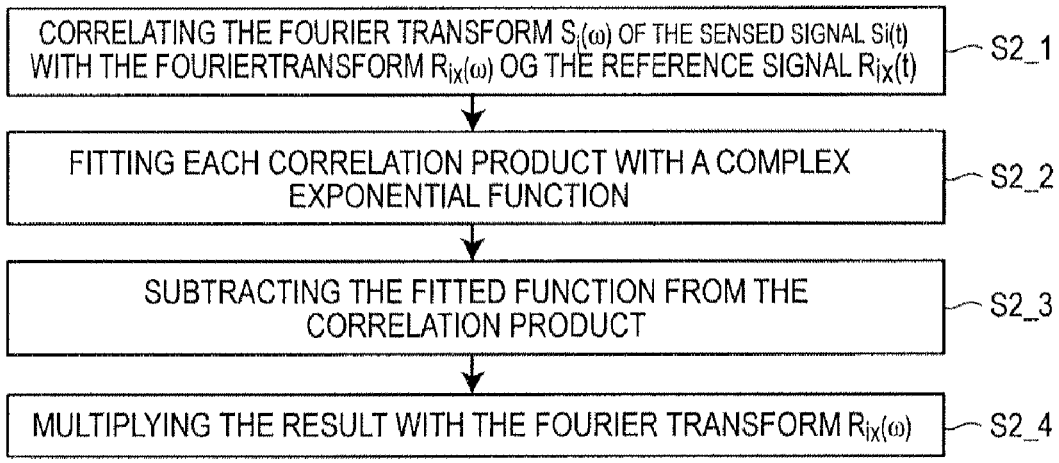
FIG. 7 illustrates details of the second step of the first embodiment.

In the first embodiment step S2 comprises a series of process steps which are illustrated in FIG. 7. Step S2_1 includes correlating each one of the sensed signals $s_i(t)$ with the reference signal $r_{ix}(t)$ which is the reference signal corresponding to the reference impact at location x of the strongest impact. The correlation is above preferably carried out by multiplying the Fourier transform $S_i(\omega)$ of the sensed signal $s_i(t)$ with the Fourier transform $R_{ix}(\omega)$ of the reference signal $r_{ix}(t)$. Then in step S2_2 each one of the correlation products is fitted with a complex exponential function and in step S2_3 the fitted functions are then subtracted from the corresponding correlation product. In step S2_4 the results obtained are then multiplied with the Fourier transform $R_{ix}(\omega)$ of the reference signal $r_{ix}(t)$ to obtain a modified Fourier transform $S_i'(\omega)$ corresponding to the modified sensed signal $s_i'(t)$.

From the modified sensed signal the position of the next strongest impact can then be determined during step S3 in the same way as the strongest impact was obtained during step S1.

The role of the subtraction of the fitted complex exponential function will now be described in detail for two simultaneous impacts $F_1$ and $F_2$. The removal of the contribution of the strongest impact by subtracting the fitted complex exponential function is based on the following considerations:

Under the assumption that the first and second impact $F_1$ and $F_2$ are realized at two positions corresponding to two positions $R_x$ and $R_y$ of reference impacts, equation 5 becomes:

$$S_i R_{ix}^* = |C_i|^2 |H_{ix}|^2 |E_x|^2 \left( e^{-j\omega\tau_x} + \frac{|C_i|^2 H_{iy} H_{ix}^*}{|C_i|^2 |H_{ix}|^2} \frac{E_y E_x^*}{|E_x|^2} e^{-j\omega\tau_y} \right) \quad (6)$$

Wherein $R_{ix}^*$ is the complex conjugate of the Fourier transform of the reference signal $R_x$ corresponding to the position x of the strongest impact. In addition, it is considered that the Fourier transform of the excitation function $E_x$ is identical to $E'_x$, meaning that the predetermined impacts and the impacts $F_1$ and $F_2$ have the same form in time.

Equation 6 makes clear that in case of a weak second impact, the second term with the phase of the weaker impact at position y is small with respect to the first term with the phase information of the first impact at location x. This is due to the ratio $|E_y|/|E_x|$ which is smaller than 1. In case of a strong first impact compared to the second impact, the information concerning the second impact will thus be drowned in the background noise. The disclosed method according to this embodiment therefore deals with eliminating or at least reducing the contribution of the first term in equation 6, so that the information concerning the second impact and its location on the interface plate becomes possible.

Introducing the variables $\alpha_{i12}$ and $\beta_{i1}$:

$$\frac{|C_i|^2 H_{iy} H_{ix}^*}{|C_i|^2 |H_{ix}|^2} \frac{E_y E_x^*}{|E_x|^2} = \alpha_{ixy} \frac{|E_y|}{|E_x|} \quad (7)$$

and $$\beta_{ix} = |C_i|^2 |H_{ix}|^2 |E_x|^2,$$

equation 6 can be rewritten as:

$$S_i R_{ix}^* = \beta_{ix} \left( e^{-j\omega\tau_x} + \alpha_{ixy} \frac{|E_y|}{|E_x|} e^{-j\omega\tau_y} \right), \quad (8)$$

and when $$\alpha_{ixy} \frac{E_y}{E_x}$$

is small compared to 1, equation 8 becomes as a first approximation:

$$S_i R_{ix}^* \approx \beta_{ix} e^{-j\omega\tau_x} \quad (9)$$

Due to the properties of $S_i R_{ix}^*$ (illustrated by equation 9) a complex exponential function $\gamma\exp(-j\omega\theta)$ can be used to fit $S_i R_{ix}^*$ for each acoustic sensor $S_i$ and to thereby determine the values of $\tau_x$ and of $\beta_{ix}$.

By subtracting the fitted function $\gamma\exp(-j\omega\theta)$ from the correlation product $S_i R_{ix}^*$, one obtains:

$$S_i R_{ix}^* - \gamma e^{-j\omega\theta} = \beta_{ix}\left(\varepsilon + \alpha_{ixy}\frac{|E_y|}{|E_x|} e^{-j\omega\tau_y}\right) \varepsilon << \alpha_{ixy}\left|\frac{E_y}{E_x}\right|, \quad (10)$$

This result is then multiplied with $R_{ix}$ to thereby obtain a Fourier transform of the modified sensed signal:

$$S'_i = \beta_{ix}\left(\varepsilon R_{ix} + \alpha_{ixy} R_{ix} \frac{|E_y|}{|E_x|} e^{-j\omega\tau_y}\right) \quad (11)$$

As can be seen, the phase of the second term in the sum only depends on the phase of the signal of impact $F_2$. With $\varepsilon$ being small compared with the second term, the contribution of the first impact has been reduced and the modified sensed signal being the Fourier transform of $S_i'$ is obtained.

To identify the location of the second impact, $S'_i$ of equation 11 is multiplied with the reference signals $R_{im}$ and the maximum value of the maxima of these correlation products is determined. The maximum then indicates the location on the interaction plate 3 at which the second strongest impact occurred.

FIGS. 8 to 11 illustrate the experimental results for two simultaneous impacts in the same experimental configuration as described above in the case of one impact. Here the ratio of the amplitudes of the weaker impact with respect to the stronger one is 1/10.

Figure 8:
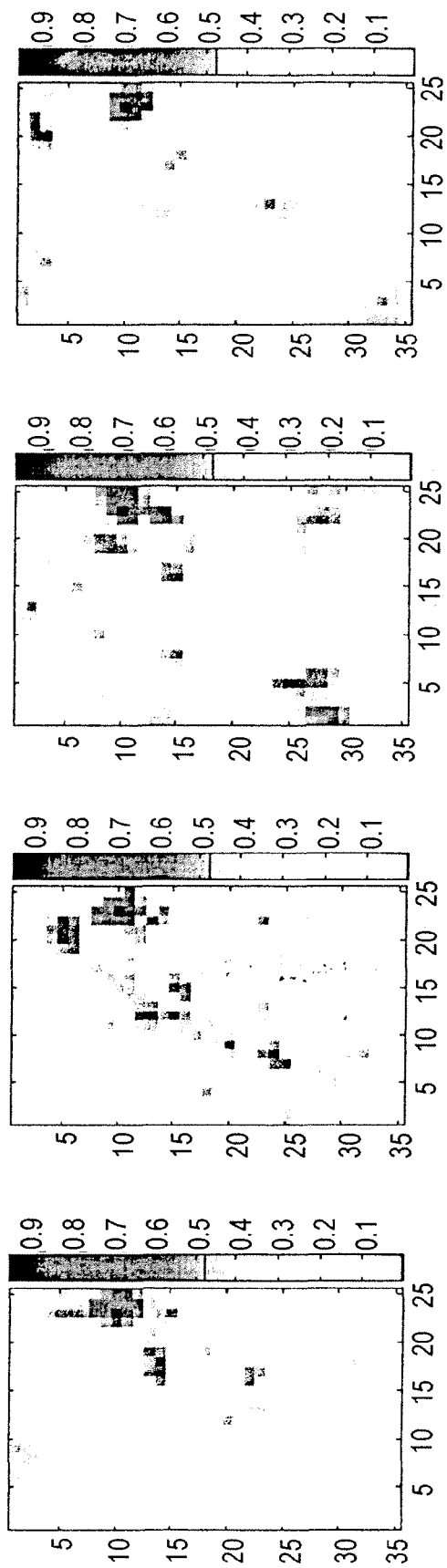
FIG. 8 illustrates maxima of correlation functions $S_iR_{im}*$ for all acoustic sensors.
Figure 8:
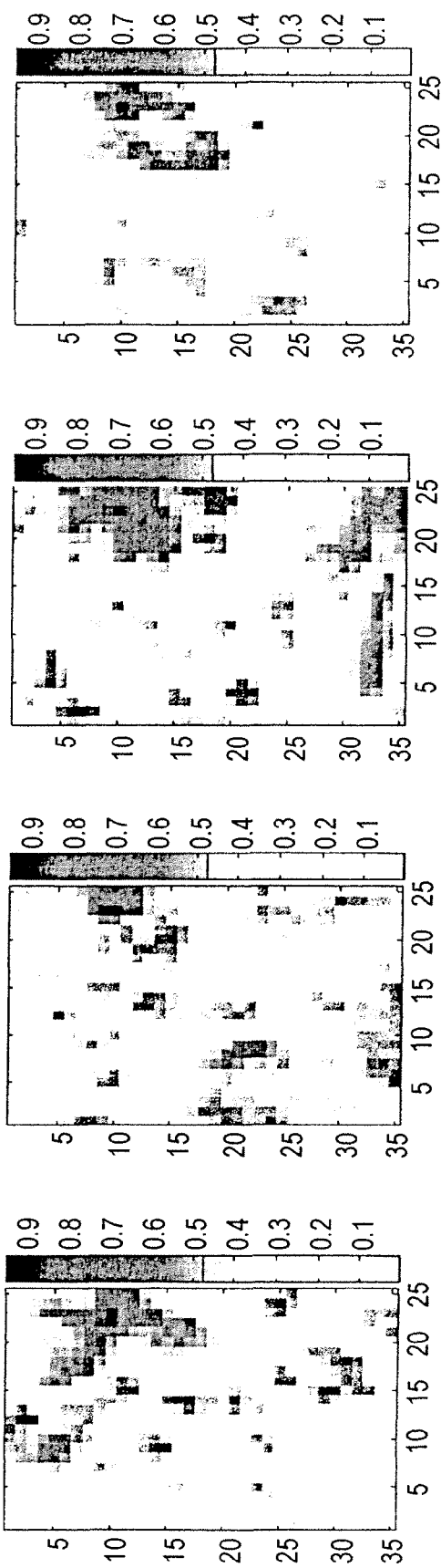
Figure 9:
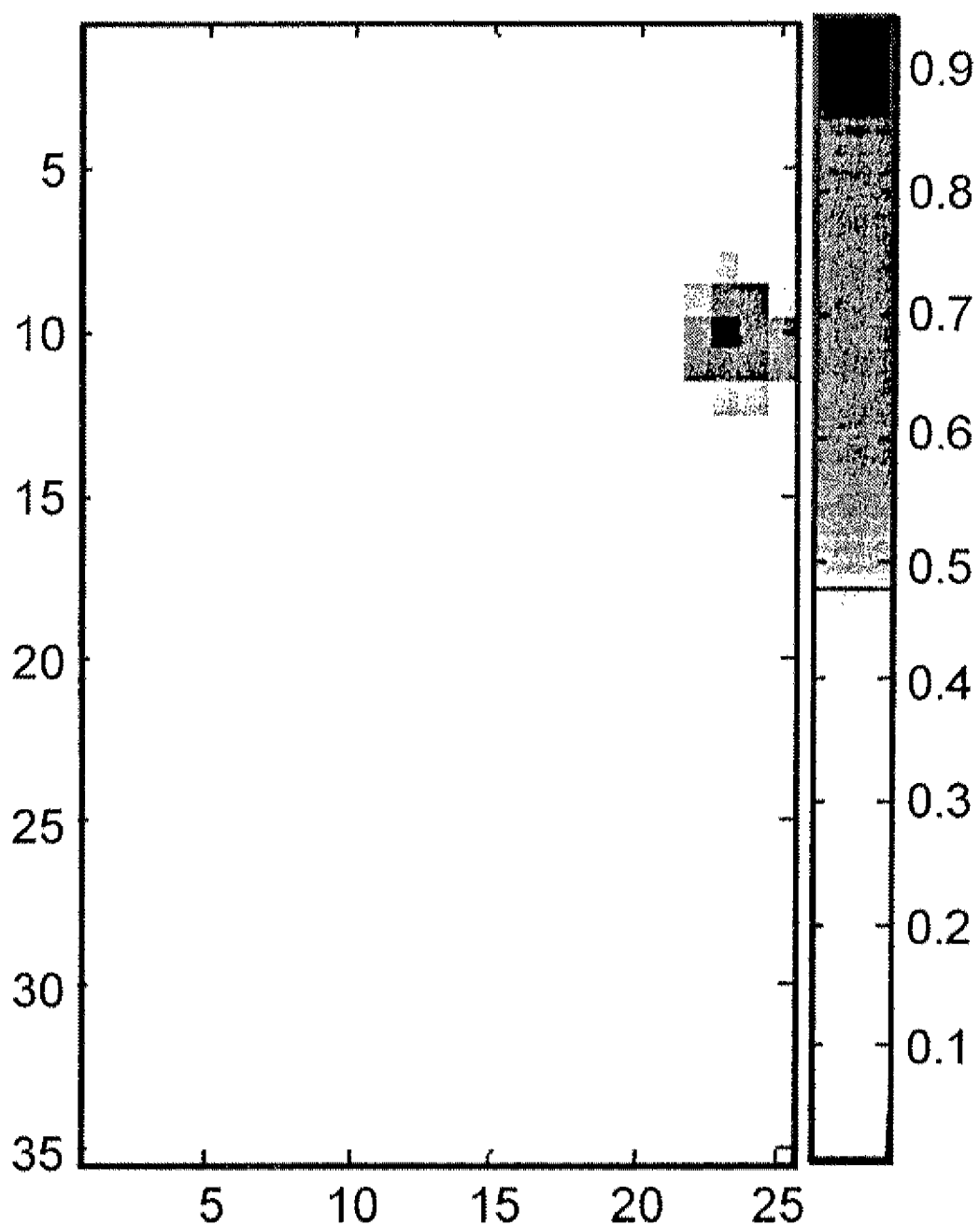
FIG. 9 illustrates the average of the maxima of correlation functions $S_iR_{im}*$

FIG. 8 illustrates for each one of the eight acoustic sensors positioned at the border of the interface plate 3, the maxima of the correlation products $S_iR_{im}*$. FIG. 9 illustrates the maxima of the correlation products of the average value calculated by averaging in the time domain. As can be seen from FIGS. 8 and 9, the various plots of the correlation products show one maximum and this even though two impacts occurred on the interaction plate 3.

Figure 10:
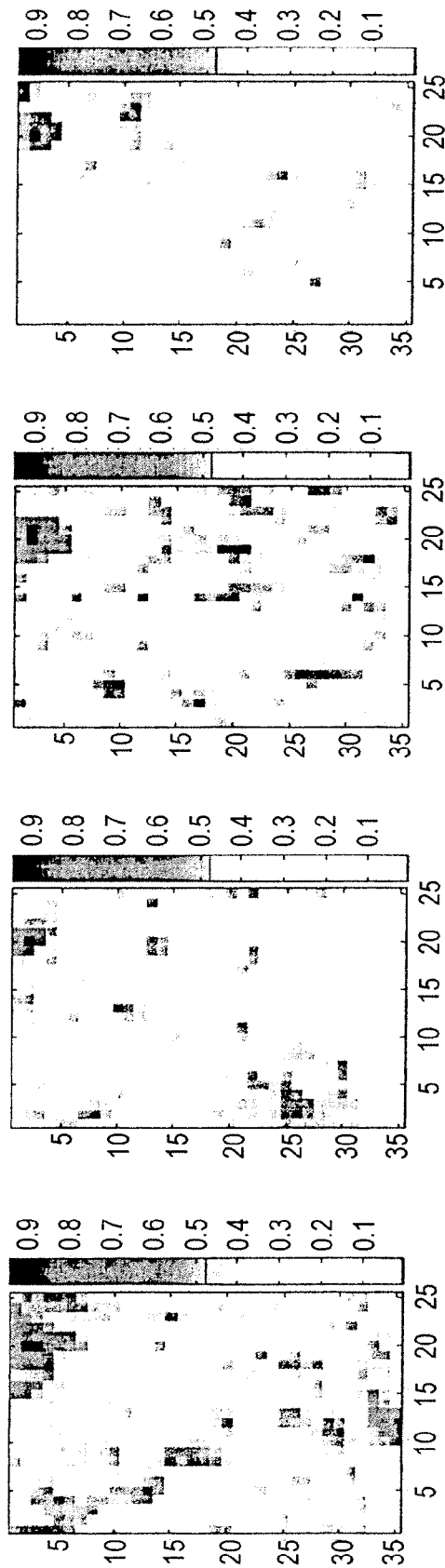
FIG. 10 illustrates maxima of correlation functions $S_i'R_{im}*$ using modified sensed signals for all acoustic sensors to identify the location of the weaker impact.
Figure 10:
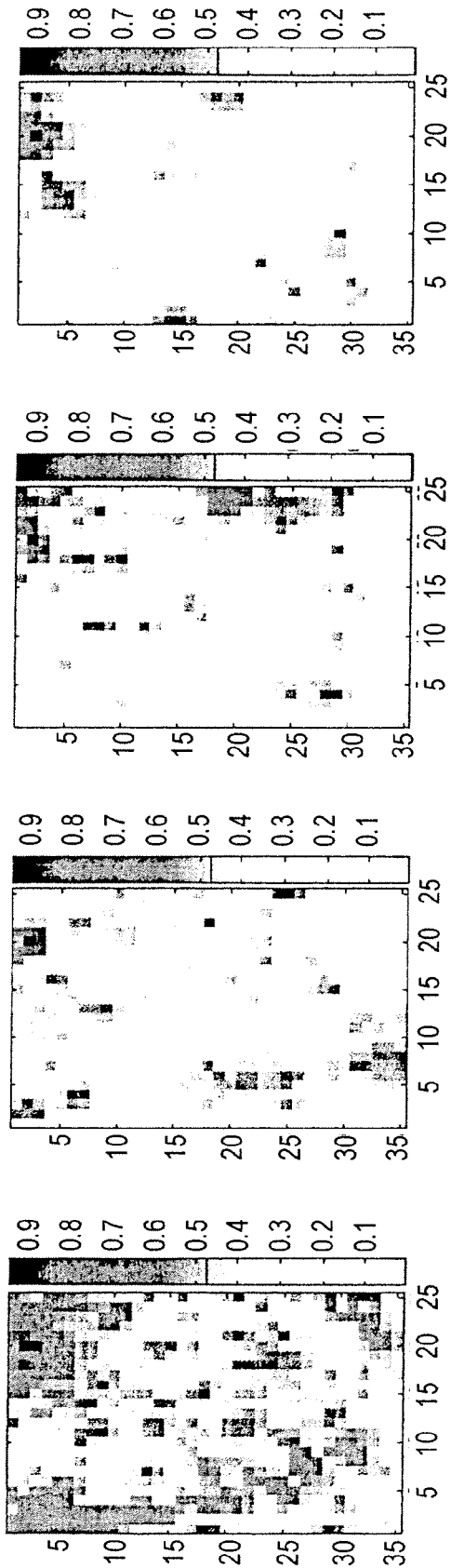
Figure 11:
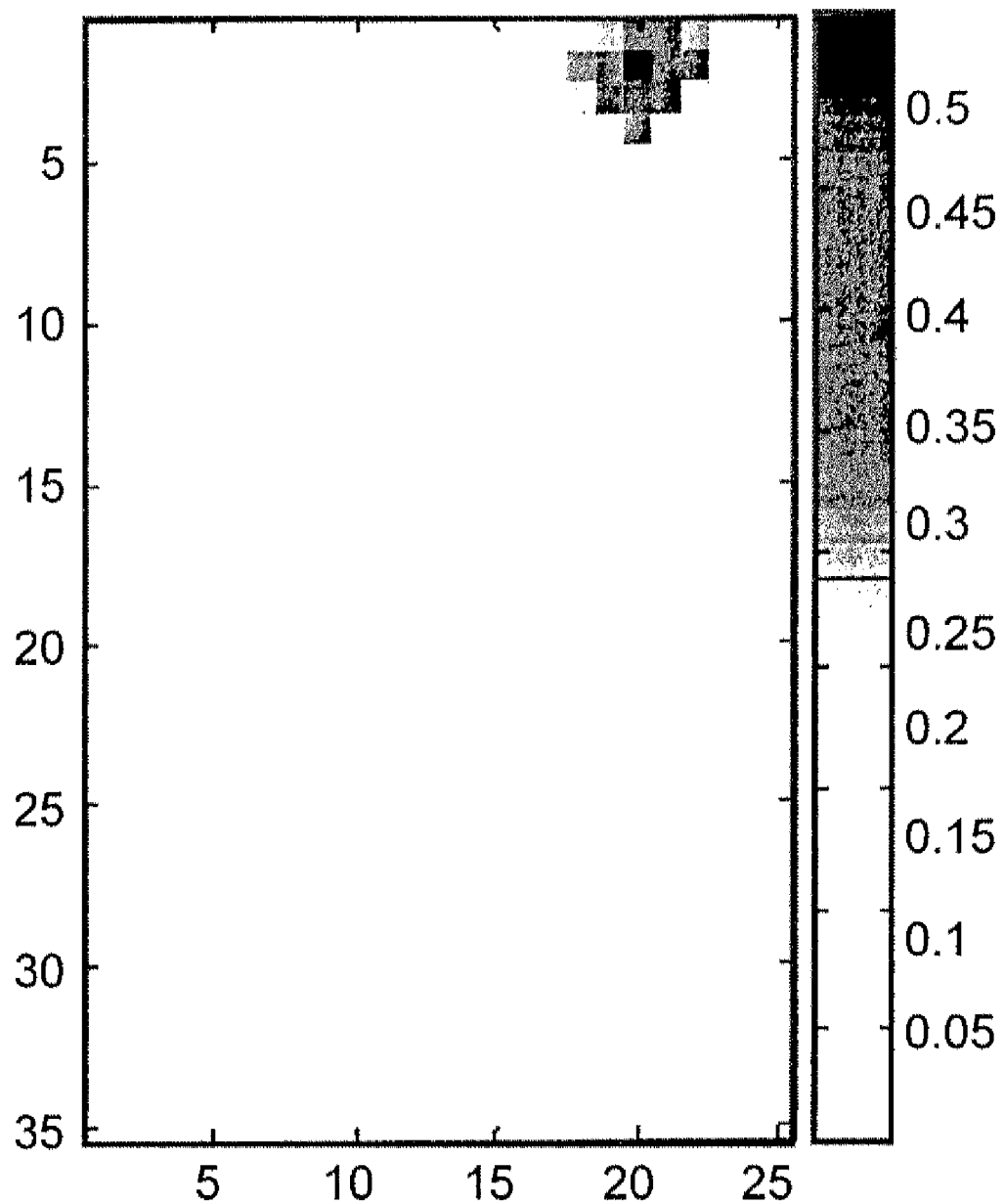
FIG. 11 illustrates the average of the maxima of correlation functions $S_i$'$R_{im}$*.

Using the above described method steps S2_1 to S2_4 of the first embodiment of the disclosure, the results as illustrated in FIG. 10 are obtained. FIG. 10 again shows maxima of correlation products, but they are now based on the modified sensed signals $S_{i'}$ and FIG. 11 the corresponding average over all acoustic sensors (again averaged in the time domain). Even though in FIG. 9 no second impact was visible (drowned in the background noise), the second impact can be clearly identified by looking at the maxima of the correlation maxima in FIGS. 10 and 11 as the modified sensed signal were used in which the contribution of the strongest impact is reduced. As a consequence, the location of second impact which was carried out with 1/10 of the strength of the first impact, can be identified in the upper right edge of the interface plate 3.

FIGS. 8-11 illustrate the case of two impacts with an amplitude ratio of 1/10. The method of the first embodiment nevertheless functions over a wide range of amplitude ratios, like can been seen from FIGS. 12a-12h. The results of FIGS. 12a to 12h were obtained the same way as described for the case of FIGS. 8 to 11, the only differences lies in the amplitude of the impacts.

Figure 12A:
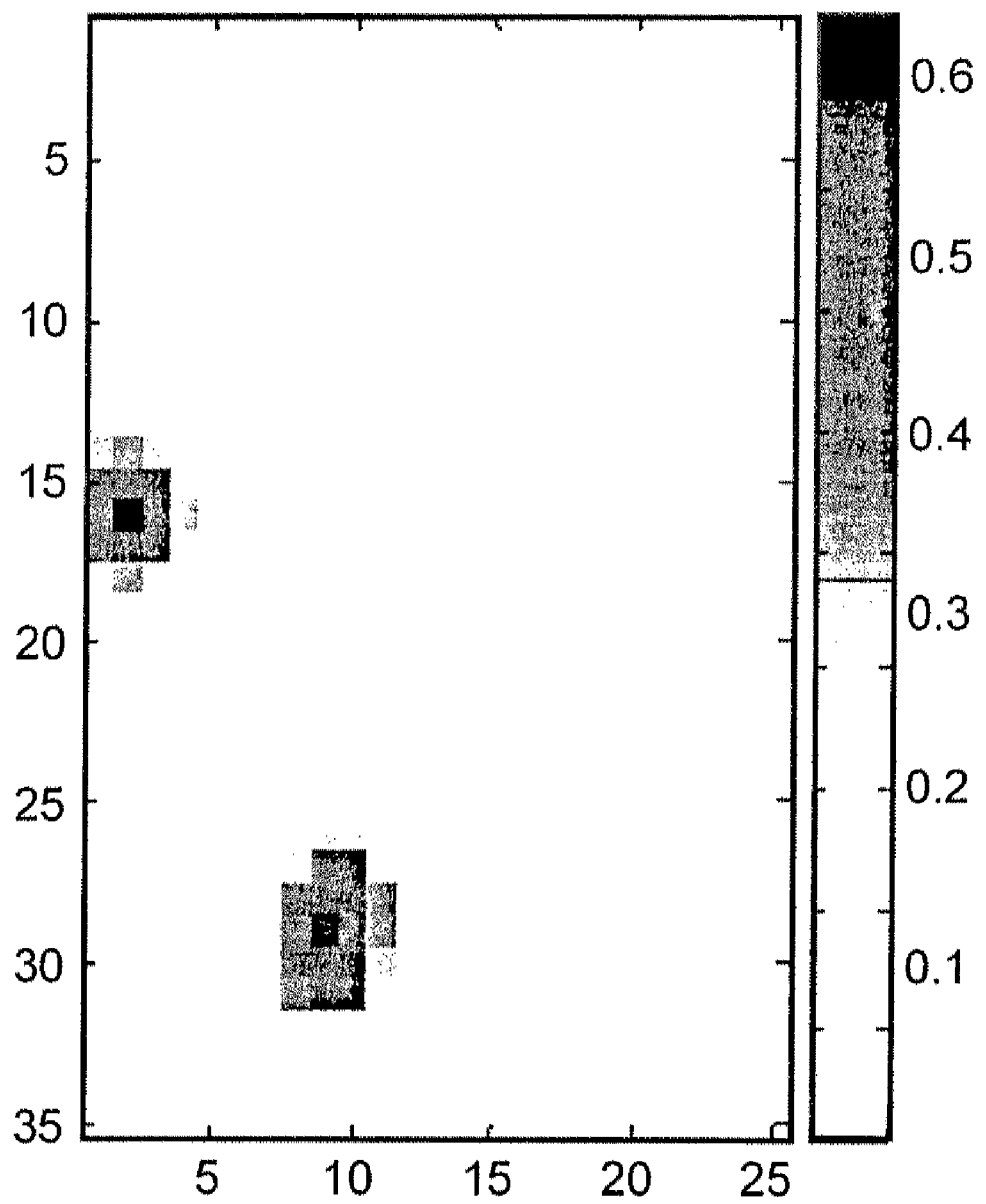
FIGS. 12a-12h illustrate the results obtained by the first embodiment for two impacts with an amplitude ratio of 1, 0.7, 0.3 and 0.01.
Figure 12B:
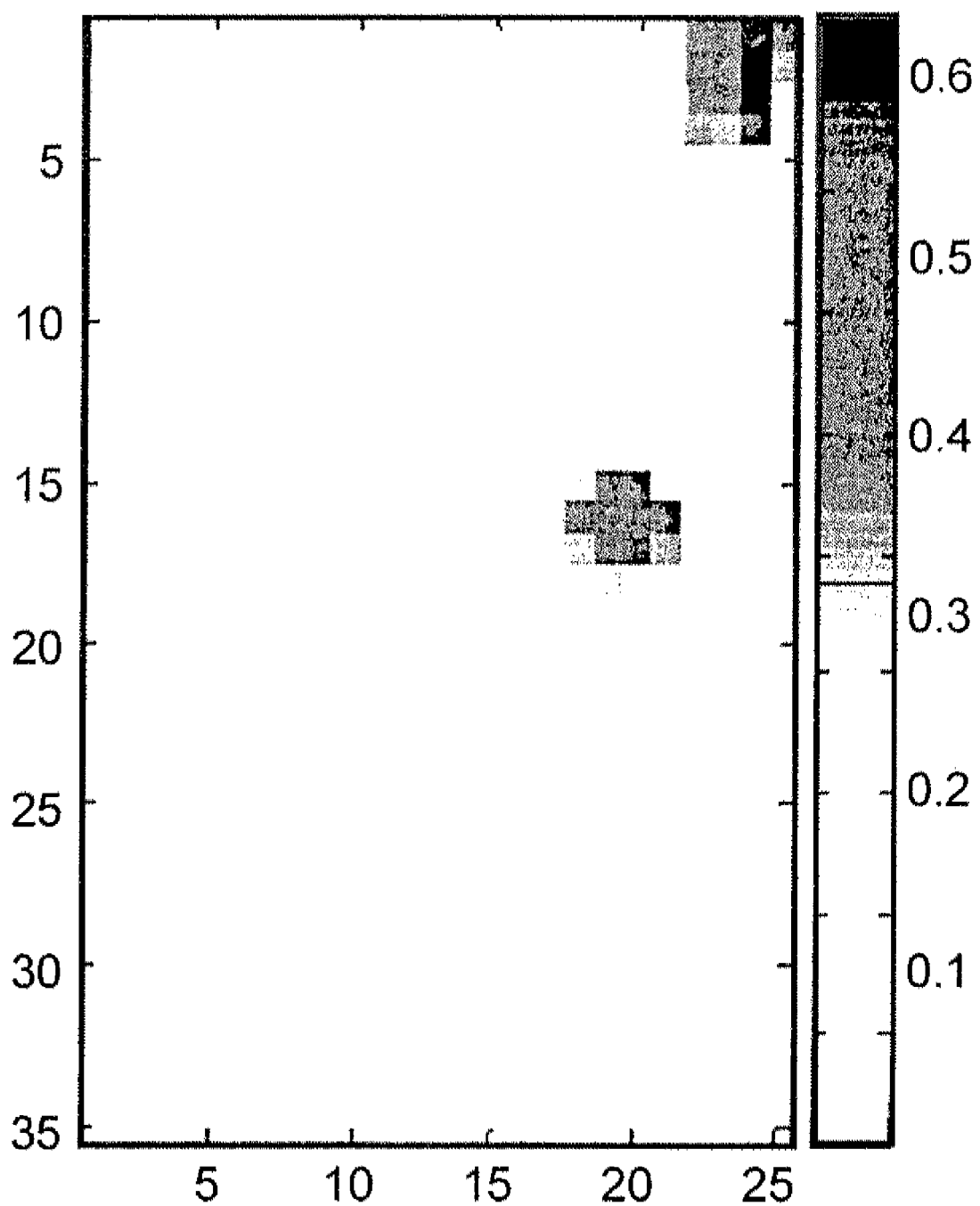
Figure 12C:
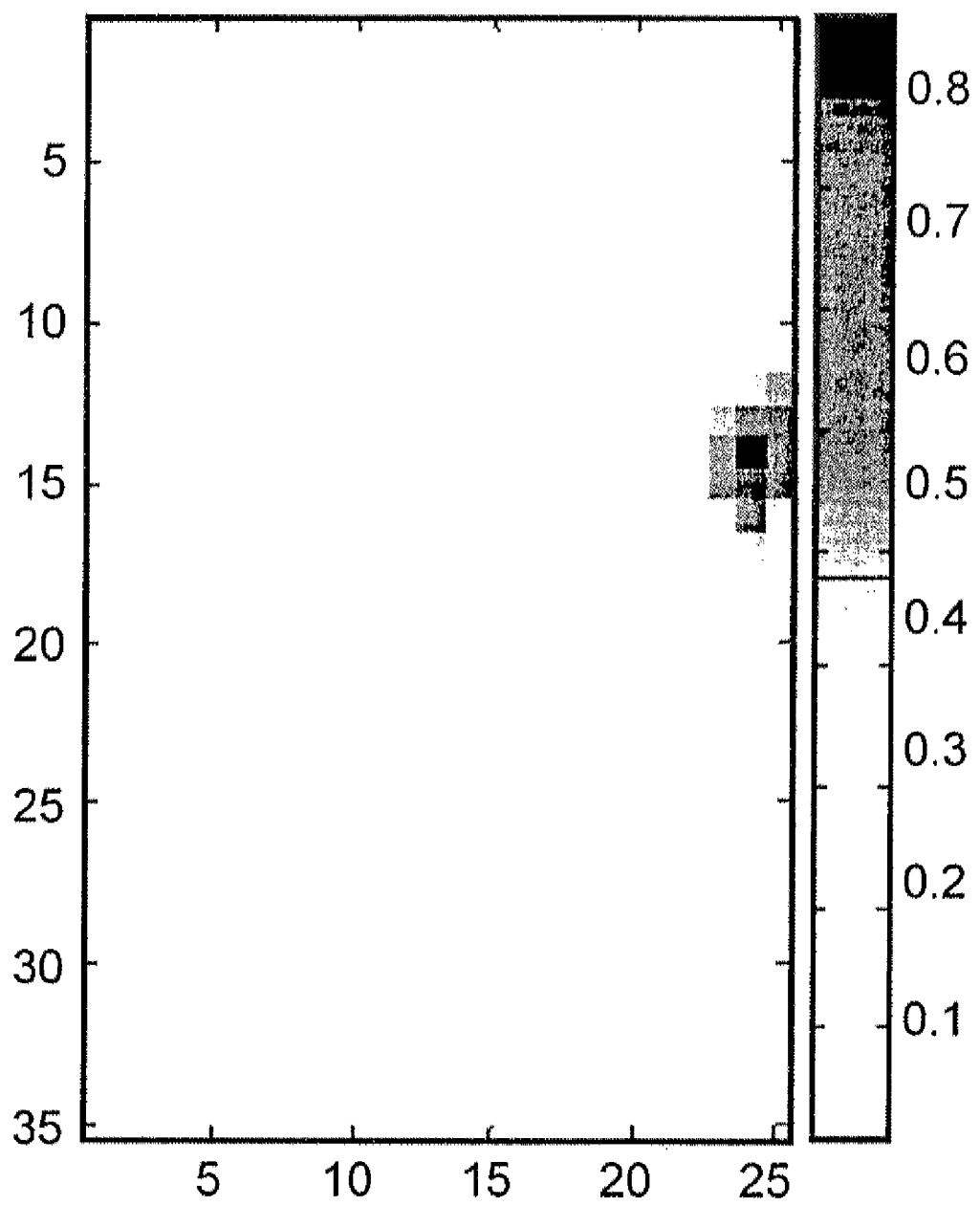
Figure 12D:
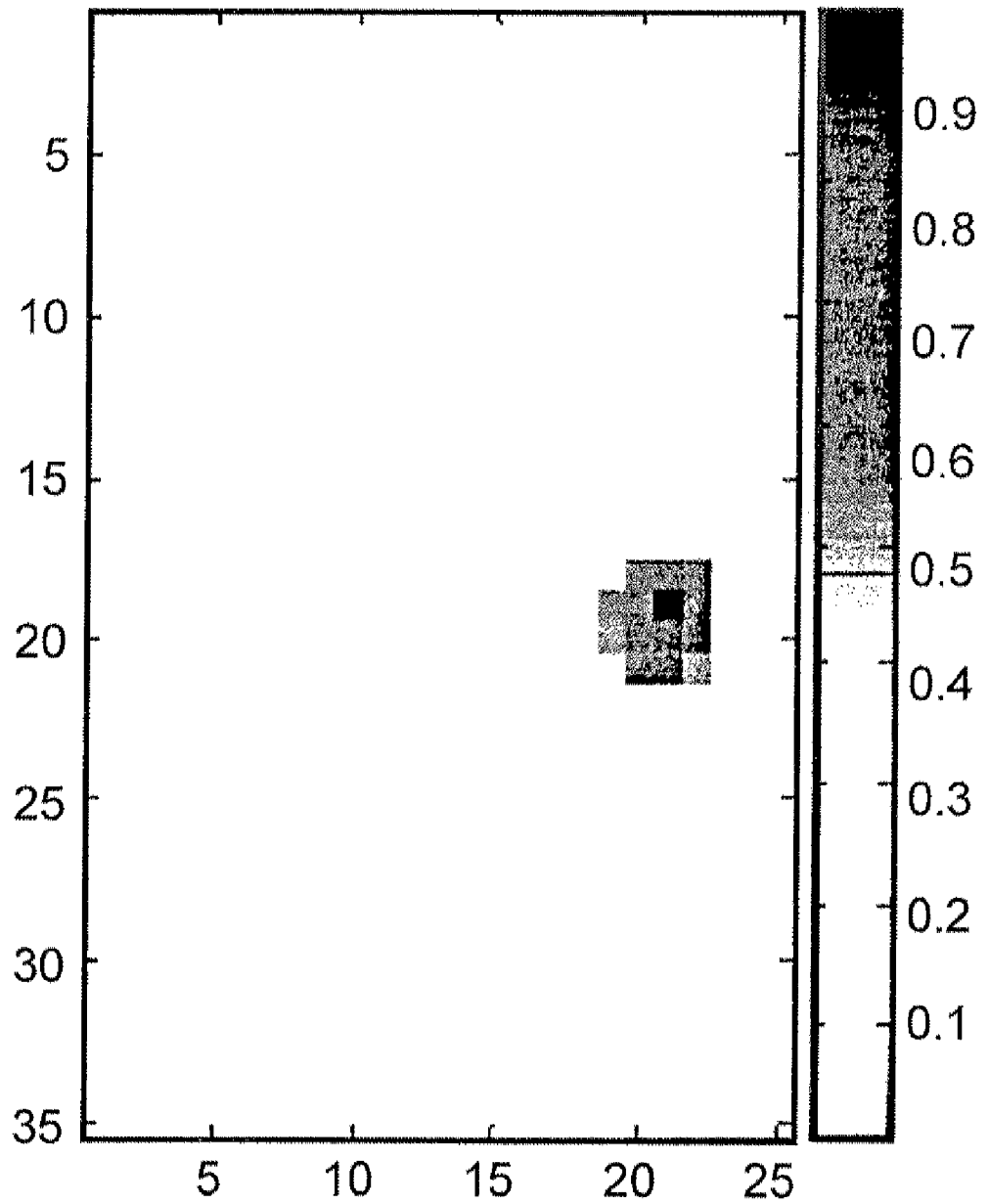
Figure 12E:
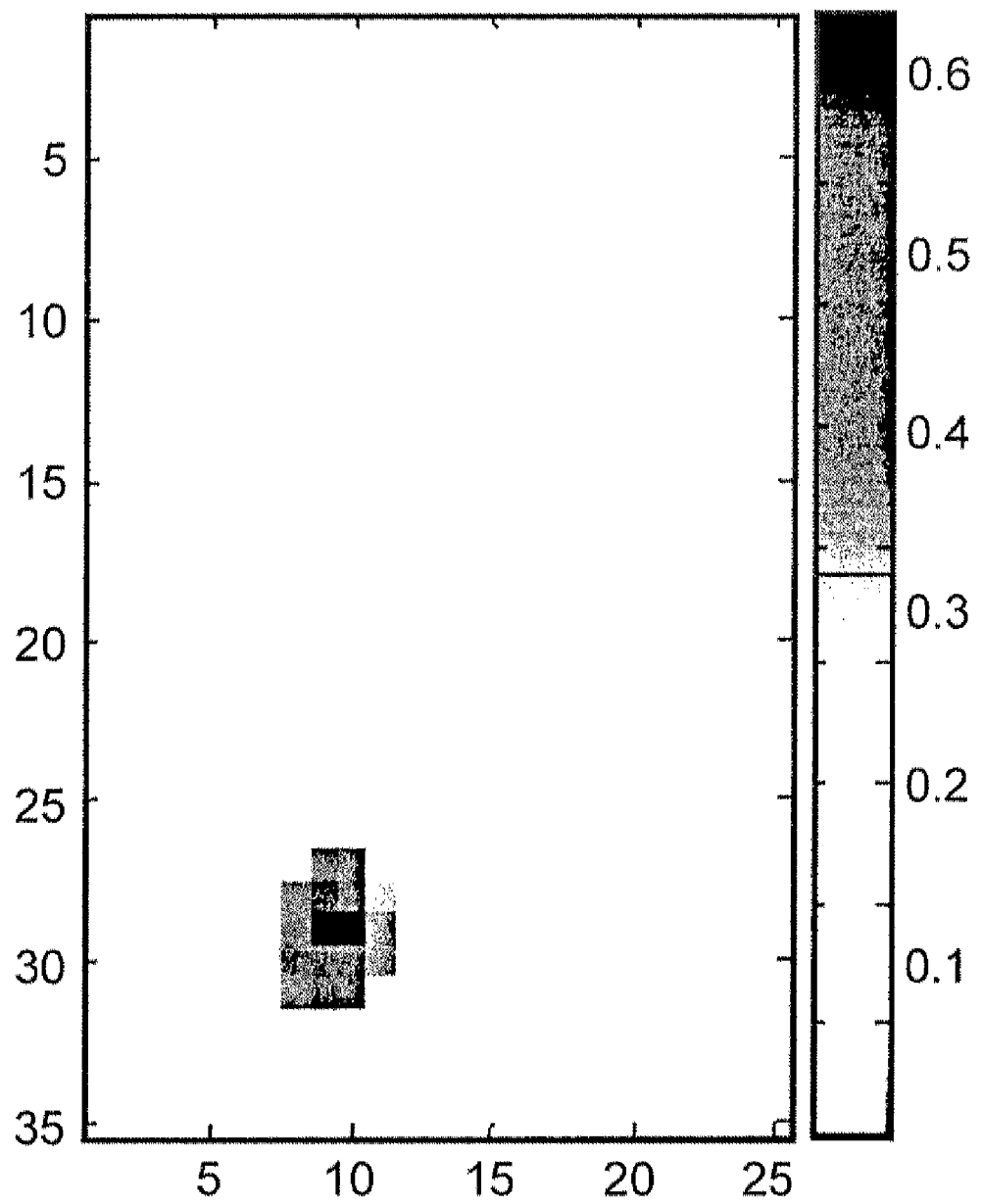
Figure 12F:
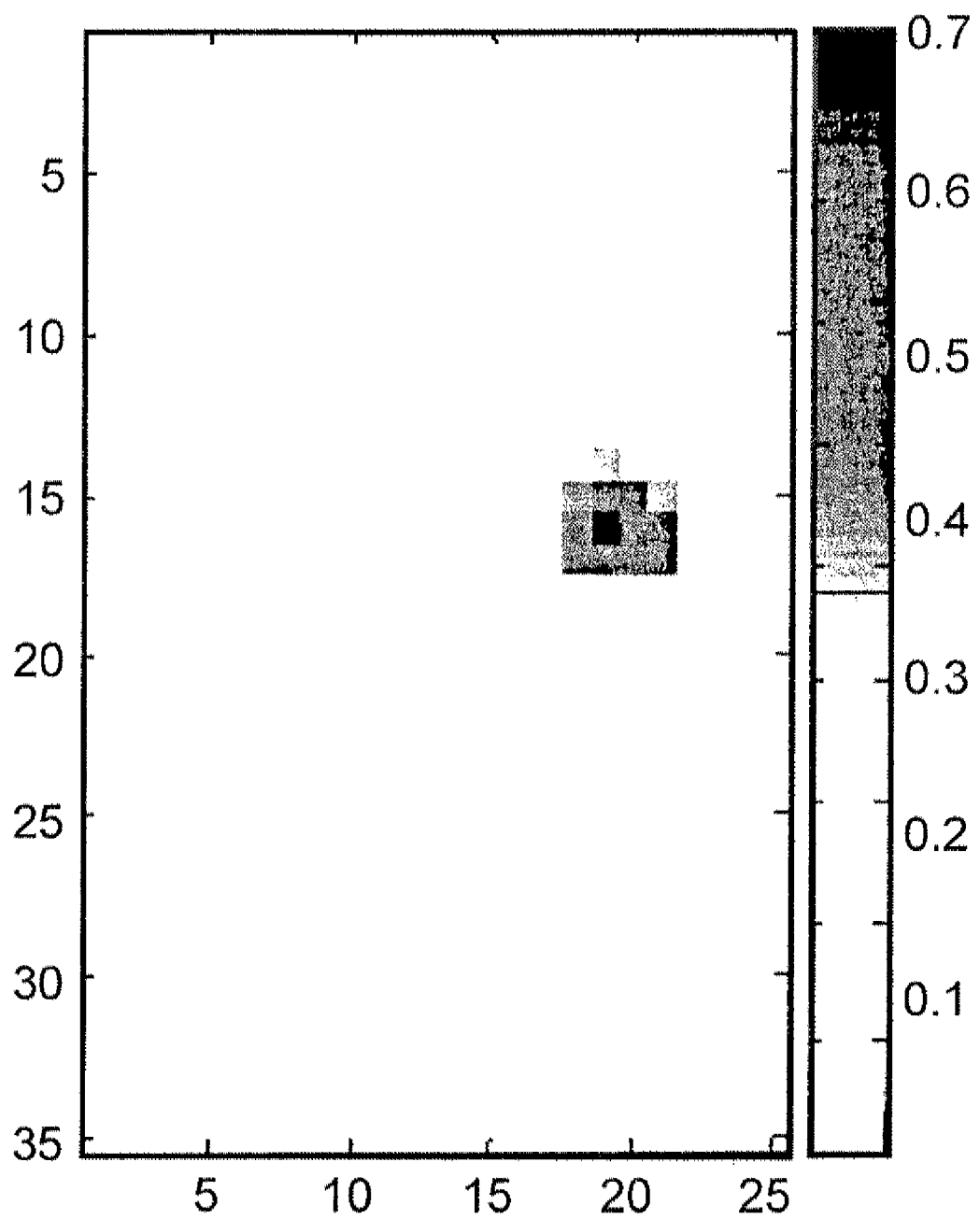
Figure 12G:
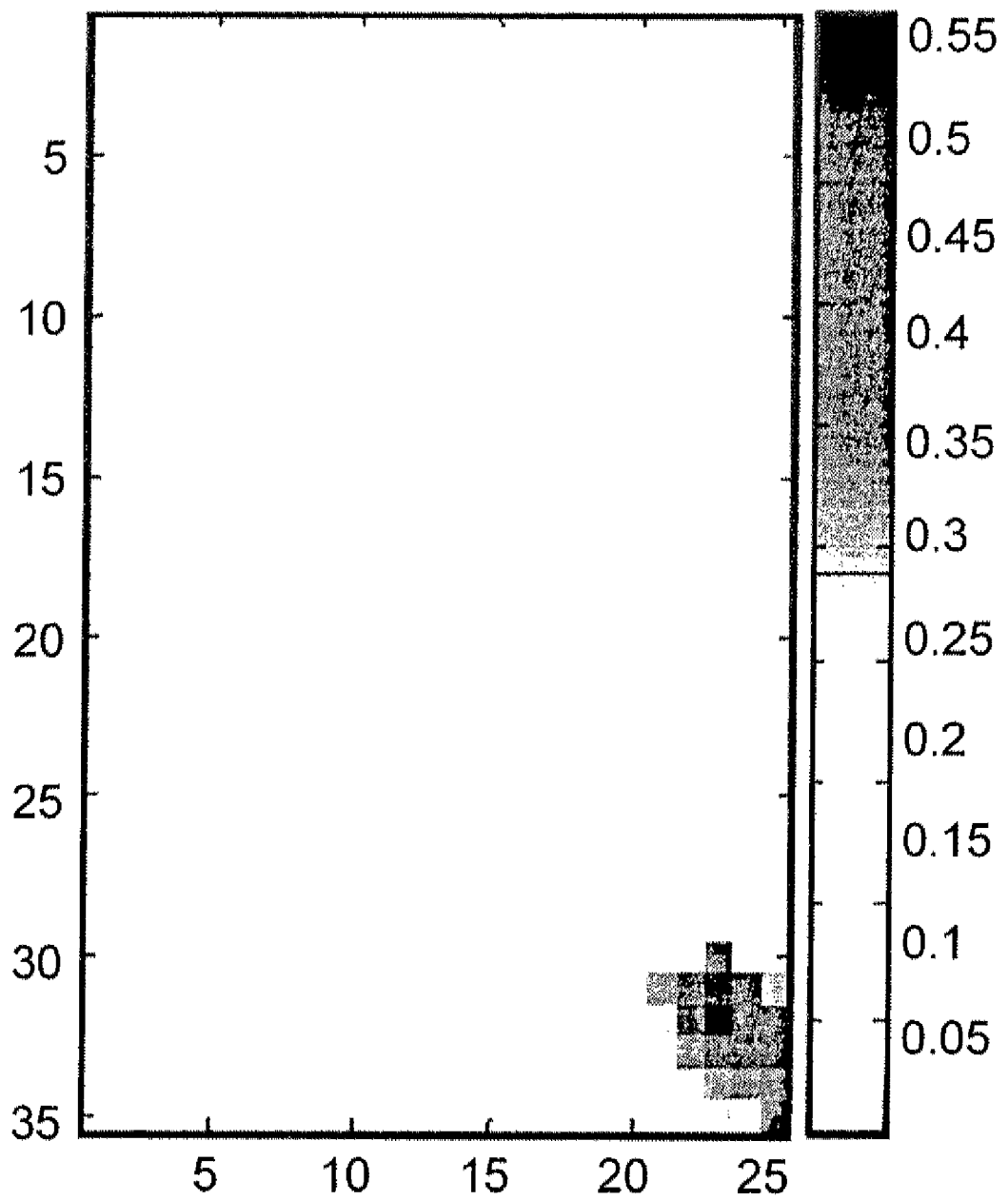
Figure 12H:
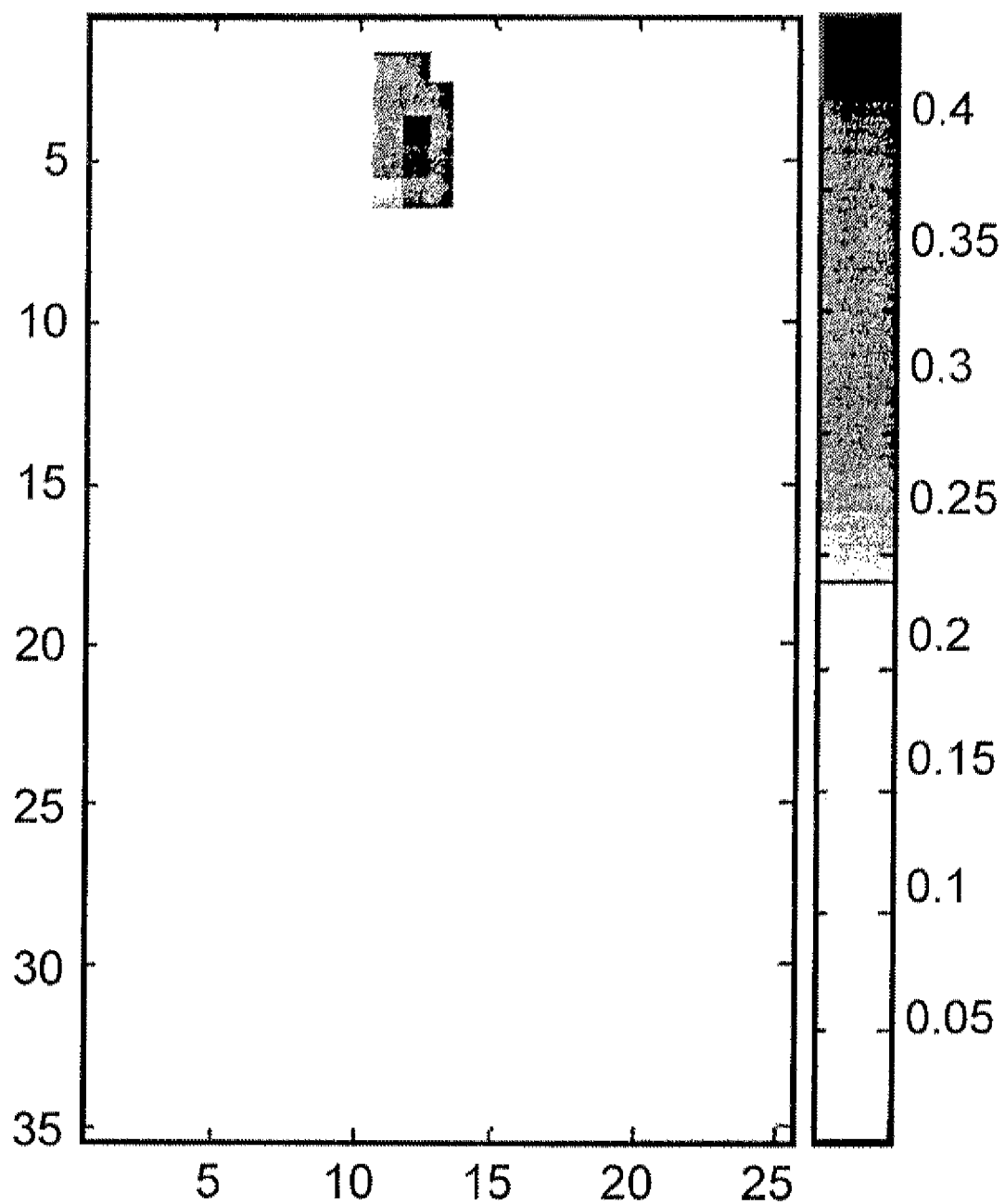

FIGS. 12a and 12e illustrate the results of localising the strongest and the "weaker" impact for an amplitude ratio of 1, FIGS. 12b and 12f the locations of the strongest and weaker impact for an amplitude ratio of 0.7, FIGS. 12c and 12d for an amplitude ratio of 0.3 and FIGS. 12d and 12h for an amplitude ratio of only 0.01. FIG. 12 shows that the first embodiment even functions for a ratio of 1. In this case, however, as can be seen on FIG. 12a, the positions of the two impacts are simultaneously visible. This is also the case for the ratio of 0.7. Using the modified sensed signal, nevertheless the influence of the one impact can be reduced which leads to a precise identification of the position of the second impact, as the contrast in the corresponding second picture (12e and 12f) is higher than in case of the corresponding FIGS. 12a and 12b.

Second Embodiment

The second embodiment according to the disclosure also relates to a method for determining the locations of at least two impacts $F_1$ and $F_2$ on a surface, like the interface plate 3, using one or more acoustic sensors $S_i$, i=1 to n, with n being the number of acoustic sensors, wherein said impacts $F_1$ and $F_2$ generate an acoustic signal being sensed by the one or more acoustic sensors $S_i$ and wherein each acoustic sensor provides a sensed signal $s_i(t)$, i=1 to n, with n being the number of acoustic sensors.

Figure 13:
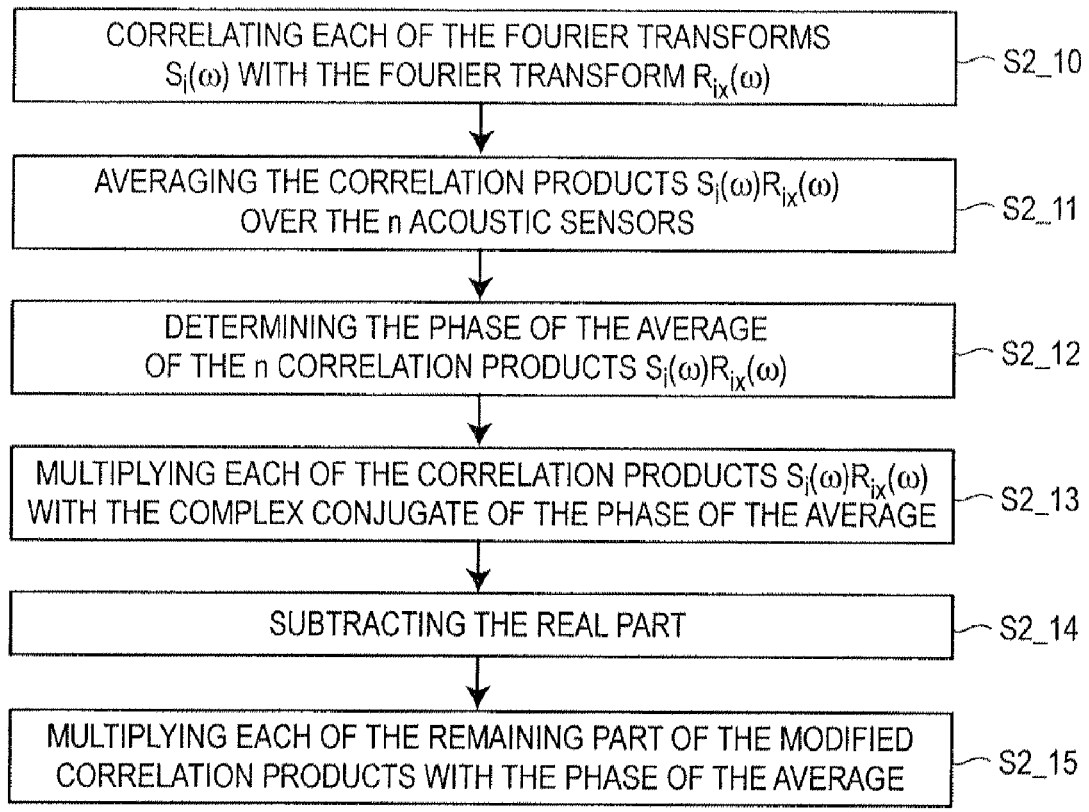
FIG. 13 illustrates details of the second step of the second embodiment of the disclosure.

The difference between the first and second embodiment is that in step S2 (see FIG. 6) the modified sensed signal $s_i'$ is determined in a different way, which compared to the first embodiment provides an improved resolution in time and space and advantageously finds its application in case the form of the excitations of the user impacts is different compared to the form of the predetermined reference impacts. The steps of S2 according to the second embodiment are illustrated in FIG. 13.

Thus, the second embodiment essentially deals with cases where $E_x \neq E'_x$. But still the method according to the second embodiment can of course also be used in a situation where the user impact and the reference impact have essentially the same form.

For two impacts, equation 5 can be rewritten as:

$$S_iR_{ix}* = |C_i|^2|H_{ix}|^2 E_x E'_x* e^{-j\omega\tau_x} + |C_i|^2 H_{iy} H_{ix}* E_y E'_x* e^{-j\omega\tau_y}, \quad (12)$$

wherein, like in the first embodiment, it is considered that the strongest impact occurred at position $R_x$ so that the convolution is again carried out by multiplying the Fourier transform of the sensed signal $S_i$ with $R_{ix}*$.

Under the assumption that the second impact is much weaker than the first one ($E_y \ll E_x$) equation 12 can be approximated as:

$$S_iR_{ix}* \approx |C_i|^2|H_{ix}|^2 E_x E'_x* e^{-j\omega\tau_x}. \quad (13)$$

Thus step S2_10 includes determining the correlation products $S_iR_{ix}*$ with $R_{ix}$ corresponding to the Fourier transform of the reference signal at position $R_x$ (like Step S2_1 of FIG. 7).

As next step S2_11, the correlation products $S_iR_{ix}*$ are averaged over the n (in this example 8) acoustic sensors $S_i$ and over all frequencies to optimize the contrast factor.

Step S2_12 then includes determining the phase of the average of the correlation products $S_iR_{ix}*$. This phase value essentially corresponds to the value of the phase in equation 13, as the phase of the excitation function is unique and detected by all sensors $S_i$. The phase contribution due to the second term in equation 12 can be neglected as the second term is small compared to the first one and furthermore, due to averaging is even further reduced. Thus by proceeding in this way, indeed the phase of the first term can be determined.

Then step S2_13 includes multiplying each one of the correlation products $S_iR_{ix}*$ with the complex conjugate of the phase of the average of the correlation products $S_iR_{ix}*$ to thereby obtain modified correlation products:

$$S_iR_{ix}*\text{Correc}* \approx |C_i|^2|H_{ix}|^2|E_x||E'_x*| + |C_i|^2 H_{iy} H_{ix}* E_y E'_x* e^{-j\omega\tau_y}\text{Correc}* \quad (14)$$

wherein Correc* corresponds to the above-mentioned complex conjugate of the phase of the average value. As it is supposed that $E_y \ll E_x$, the real part of equation 14 is predominantly due to the first term, so that by subtracting (step S2_14)

the real part from equation 14, the contribution of the first term, which is due to the strongest impact can be reduced or even removed.

Next, according to step S2_15, the remaining parts of the modified correlation products are multiplied with the phase of the average to thereby obtain:

$$S'_i R_{ix}{}^* \approx |C_i|^2 H_{iy} H_{ix}{}^* E_y E'_x{}^* e^{j\omega\tau_y} \quad (15)$$

To finally obtain the desired modified sensed signal $S_i'$ the results obtained in step S1_15 are again multiplied by the Fourier transform $R_{ix}(\omega)$ of the reference signal $r_{ix}(t)$ to thereby obtain the modified sensed signal from which the contribution of the strongest impact has been reduced:

$$S'_i \approx |C_i|^2 H_{iy} H_{ix}{}^* E_y E'_x{}^* e^{-j\omega\tau_y} R_{ix} \quad (16)$$

To obtain the location of the second impact, step s3, like in embodiment 1 and as illustrated in FIG. 6, can again be carried out. The modified sensed signals $S_i'$ are thus multiplied with all of the Fourier transforms $R_{ix}{}^*$ of the reference signals (corresponding to correlations in the time domain) and the correlation maxima are compared with each other. The location of the second impact on the interface plate 3 then corresponds to the maximum value of the correlation maxima.

Third Embodiment

Figure 14:
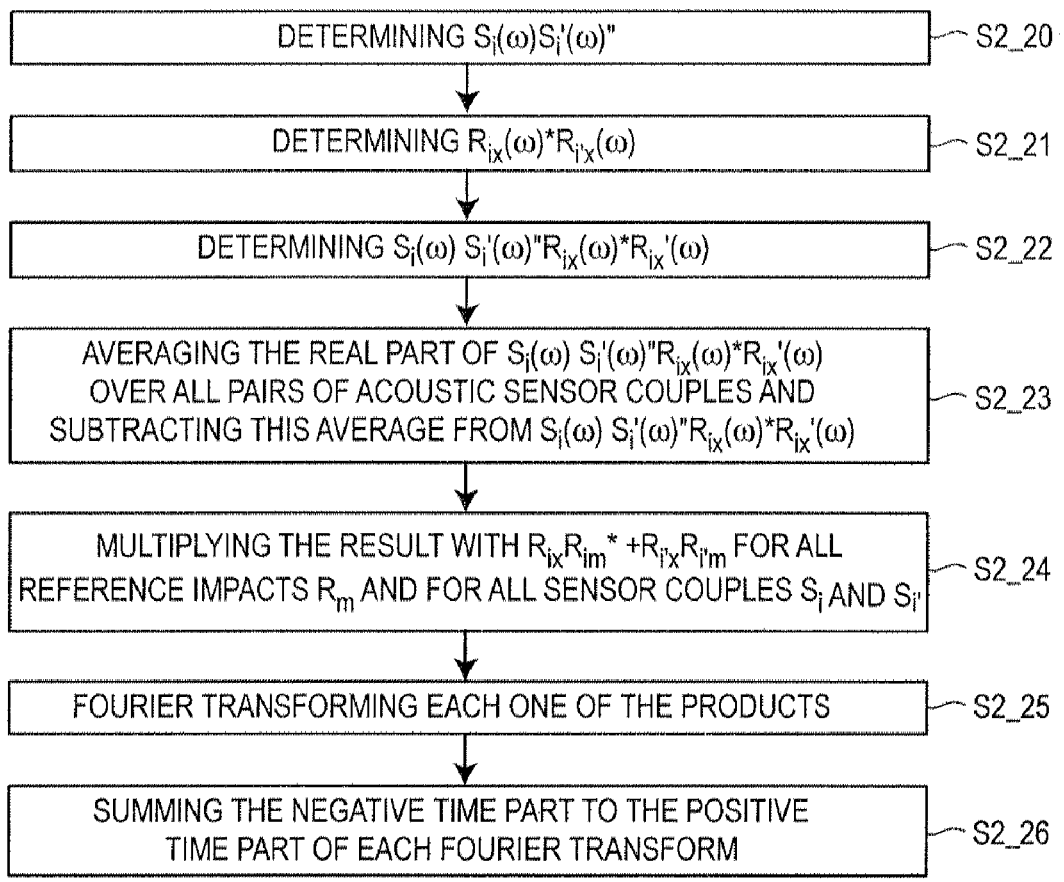
FIG. 14 illustrates the process steps of the third embodiment.

Embodiment 3 of the disclosure relates to a further method for determining the location of at least two impacts $F_1$ and $F_2$ on a surface, like the interface plate 3 illustrated in FIG. 1, using one or more acoustic sensors $S_i$, i=1 to n, with n being the number of acoustic sensors, wherein the impacts $F_1$ and $F_2$ generate an acoustic signal being sensed by the one or more acoustic sensors, wherein each acoustic sensor provides a sensed signal $s_i(t)$, i=1 to n. Like the second embodiment also the third embodiment provides an improved resolution so that in cases when the excitation of the real impact and the one of the predetermined reference impacts are different, the localization of the positions of both impacts on the interface plate 3 can still be achieved. The process steps of the third embodiment are illustrated in FIG. 14.

Step S1 corresponds to the one of the first and second embodiment.

In contrast to the first and second embodiment dealing with correlations of sensed signals with reference signals, the third embodiment is based on coupled correlations of the sensed signals ($S_i S_{i'}{}^*$) and coupled correlations of the reference signals ($R_{ix} R_{i'x}$).

Starting from equation 2, a coupled correlation for acoustic sensors $S_i$ and $S_{i'}$ has the following form (first correlation couples):

$$S_i S_{i'}{}^* = \sum_{j=1}^{M} C_i H_{ij} E_j e^{-j\omega\tau_j} \sum_{j=1}^{M} C_{i'}^* H_{i'j}^* E_j^* e^{+j\omega\tau_j} \quad (17)$$

and for the reference signals, one obtains for the acoustic sensors $R_{im}$ and $R_{i'm}$ for a reference impact realized at position $R_m$ (see FIG. 1), the following correlation product (second correlation couples):

$$R_{im} R_{i'm}{}^* = C_i C_{i'}^* H_{im} H_{i'm}^* |E'_m|^2 \quad (18)$$

Steps S2-20 and S2_21 thus includes determining the correlation couples as shown in equations 17 and 18.

Step S20_22 then includes correlating the first and second correlation products to obtain a third correlation product namely $S_i S_{i'}{}^* R_{im} R_{i'm}{}^*$.

Under the assumption that the two impacts $F_1$ and $F_2$ occurred at positions of reference impacts, namely $R_x$ and $R_y$, the correlation product $S_i S_{i'}{}^*$ can be written as:

$$S_i S_{i'}^* = \begin{pmatrix} C_i H_{ix} E_x e^{-j\omega\tau_x} + \\ C_i H_{iy} E_y e^{-j\omega\tau_y} \end{pmatrix} \begin{pmatrix} C_{i'}^* H_{i'x}^* E_x^* e^{+j\omega\tau_x} + \\ C_{i'}^* H_{i'y}^* E_y^* e^{+j\omega\tau_y} \end{pmatrix} \quad (19)$$

$$= C_i H_{ix} C_{i'}^* H_{i'x}^* |E_x|^2 + C_i H_{iy} C_{i'}^* H_{i'y}^* |E_y|^2 +$$

$$C_i H_{ix} E_x C_{i'}^* H_{i'y}^* E_y^* e^{-j\omega(\tau_x - \tau_y)} +$$

$$C_i H_{iy} E_y C_{i'}^* H_{i'x}^* E_x^* e^{+j\omega(\tau_x - \tau_y)}$$

When the modulus $|E_y| < |E_x|$, the first term in the sum is predominant and the second term is the smallest one, as $|E_x|^2 \gg |E_x E_y| \gg |E_y|^2$. In this case the phase, which is the information the most important to identify the locations of the impacts, of the signals of the second impact are drowned in the background noise of the strongest impact. However, here also the third and fourth term carry information about the first but also the second impact.

Now taking the strongest impact at position $R_x$, like in the previous embodiments, the correlation $S_i S_{i'}{}^*$ correlated with the correlation of the reference impact at position $R_x$ provides the following:

$$S_i S_{i'}^* R_{ix}^* R_{i'x} = |C_i|^2 |C_{i'}|^2 |H_{ix}|^2 |H_{i'x}|^2 |E_x|^2 |E'_x|^2 + \quad (20)$$

$$|C_i|^2 |C_{i'}|^2 |E_y|^2 |E'_x|^2 H_{iy} H_{i'y}^* H_{ix}^* H_{i'x} +$$

$$|C_i|^2 |C_{i'}|^2 |H_{ix}|^2 |E'_x|^2 E_x E_y^* H_{i'x} H_{i'y}^* e^{-j\omega(\tau_x - \tau_y)} +$$

$$|C_i|^2 |C_{i'}|^2 |H_{i'x}|^2 |E'_x|^2 E_x^* E_y H_{ix}^* H_{iy} e^{+j\omega(\tau_x - \tau_y)}$$

Unlike in the first embodiment, in the third embodiment one does not aim at identifying contributions of the first impact only, which in equation 20 would correspond to the first, third and fourth term (all of them carry information about the first impact), in order to remove that contribution to finally identify the second term (by removing the identified first, third and fourth contributions) to thereby obtain information about the location of the second impact. Actually according to the third embodiment, one looks at identifying the contributions of the third and fourth term and to use them to identify the location of the second impact.

To do so, step S2_23 then includes averaging the real part of the third correlation product $S_i S_{i'}{}^* R_{im} R_{i'm}{}^*$ over all pairs of acoustic sensor couples and subtracting the obtained average value from the third correlation products. The obtained results will be called $P_{ii'x}$ in the following.

As can be seen from equation 20, the first term corresponds to an autocorrelation which thus has a real value. The second to fourth terms are complex numbers and it appears that due to the summing over all couples of acoustic sensors their contribution is strongly reduced which is based essentially on the fact that their real part oscillates around 0.

Having determined $P_{ii'x}$ for all sensor couples, the method according to the third embodiment proceeds with extracting the location of the second impact out of that value (Step S3).

Step S3_24 includes multiplying $P_{ii'x}$ with the sum of $R_{ix} R_{im}{}^* + R_{i'x}{}^* R_{i'm}$ for all reference impacts $R_m$ and for all sensor couples $S_i$ and $S_{i'}$.

The next step (s3_S25) includes Fourier transforming each one of the obtained products and in summing the negative time part to the positive time part of each one of the Fourier transforms.

Here one takes advantage of the fact that except for the terms $H_x*H_{iy}$ and $H_{ix}H_{i'y}*$ the third and fourth term in equation 20 correspond to complex conjugated terms. For m=y (thus the location of the second impact), the Fourier transforms of the two resulting products have the maxima at opposite values with respect to the time axis. Therefore one of the two products needs to be conjugated to obtain a correct result. Thus by carrying out steps S3_23 and S3_25, the third and fourth term of equation 20 can be identified.

Figure 15:
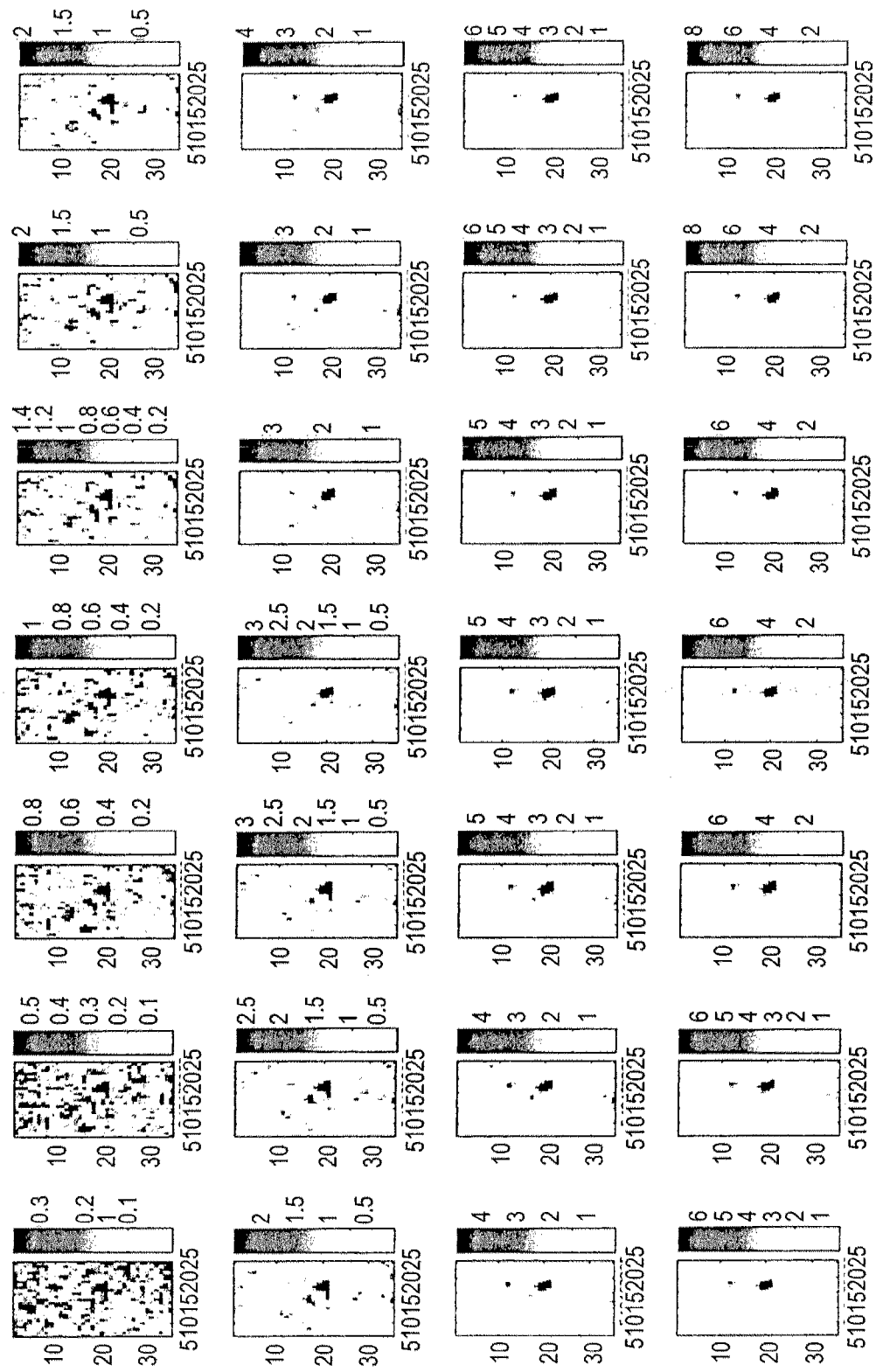
FIG. 15 illustrates the results used to determining the strongest impact using correlations of couples of acoustic sensors and couples of reference signals.
Figure 16:
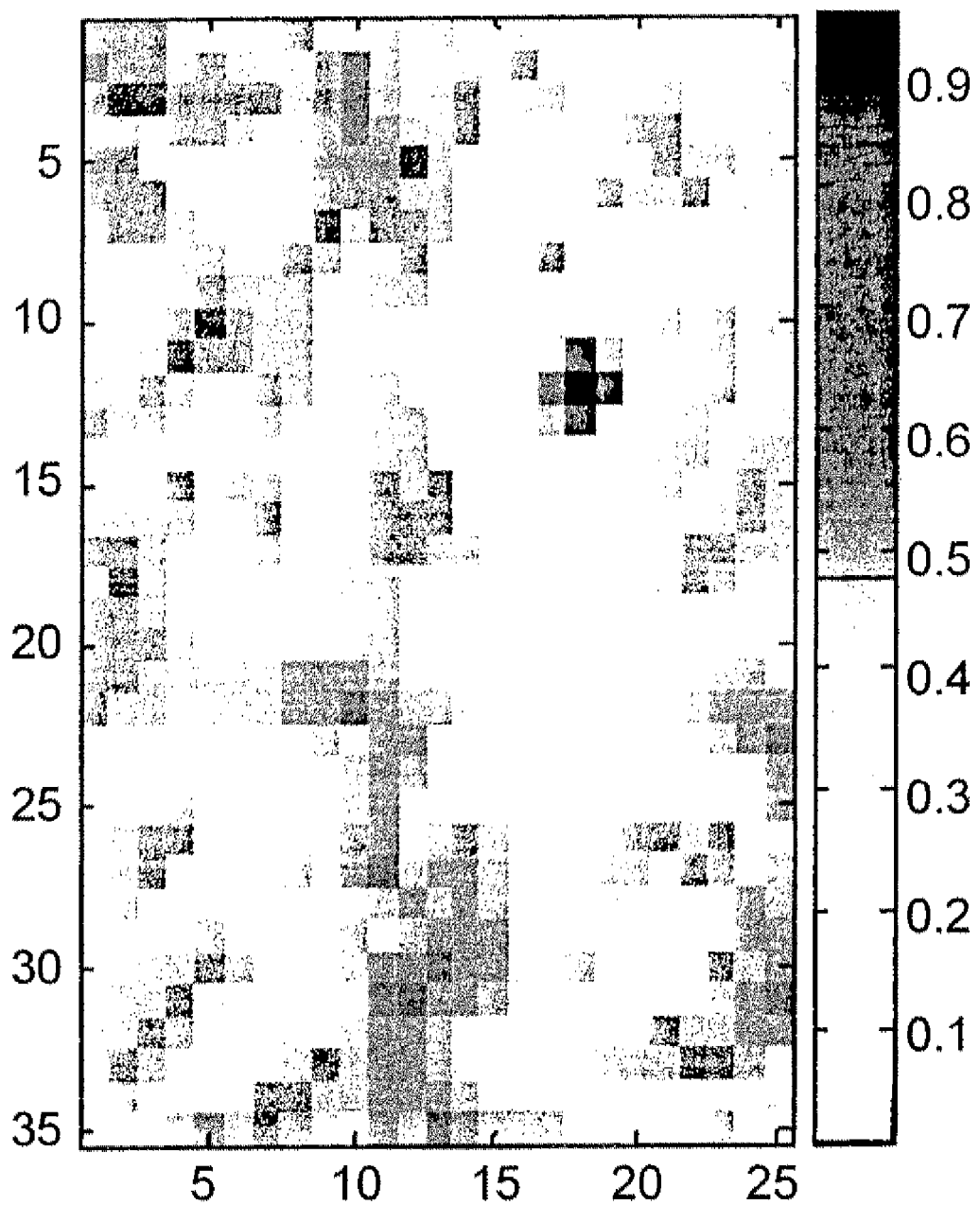
FIG. 16 illustrates the average of the correlation maxima of FIG. 15.
Figure 17:
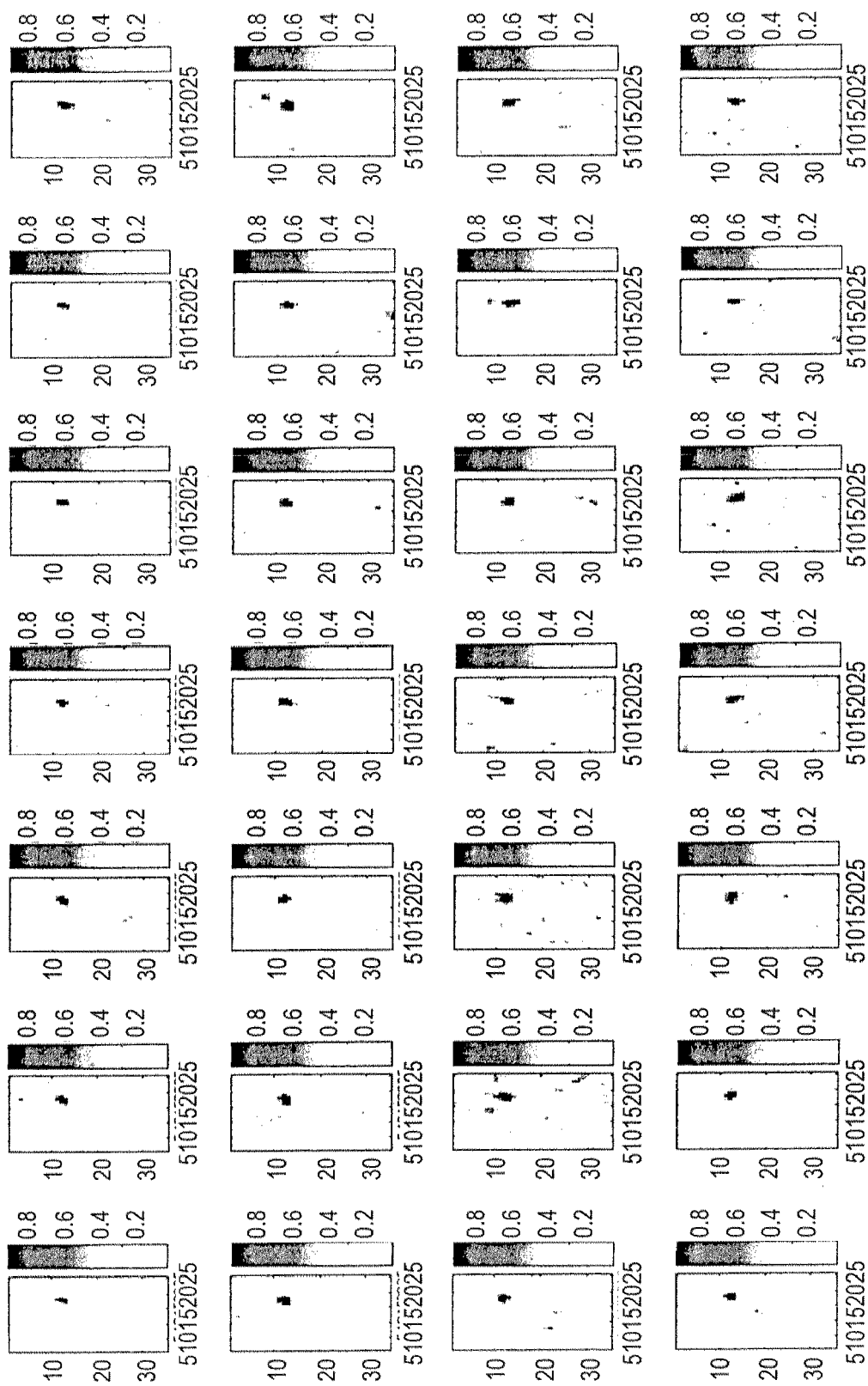
FIG. 17 illustrates the results used to determine the second impact using modified correlations of couples of acoustic sensors and couples of reference signals.
Figure 18:
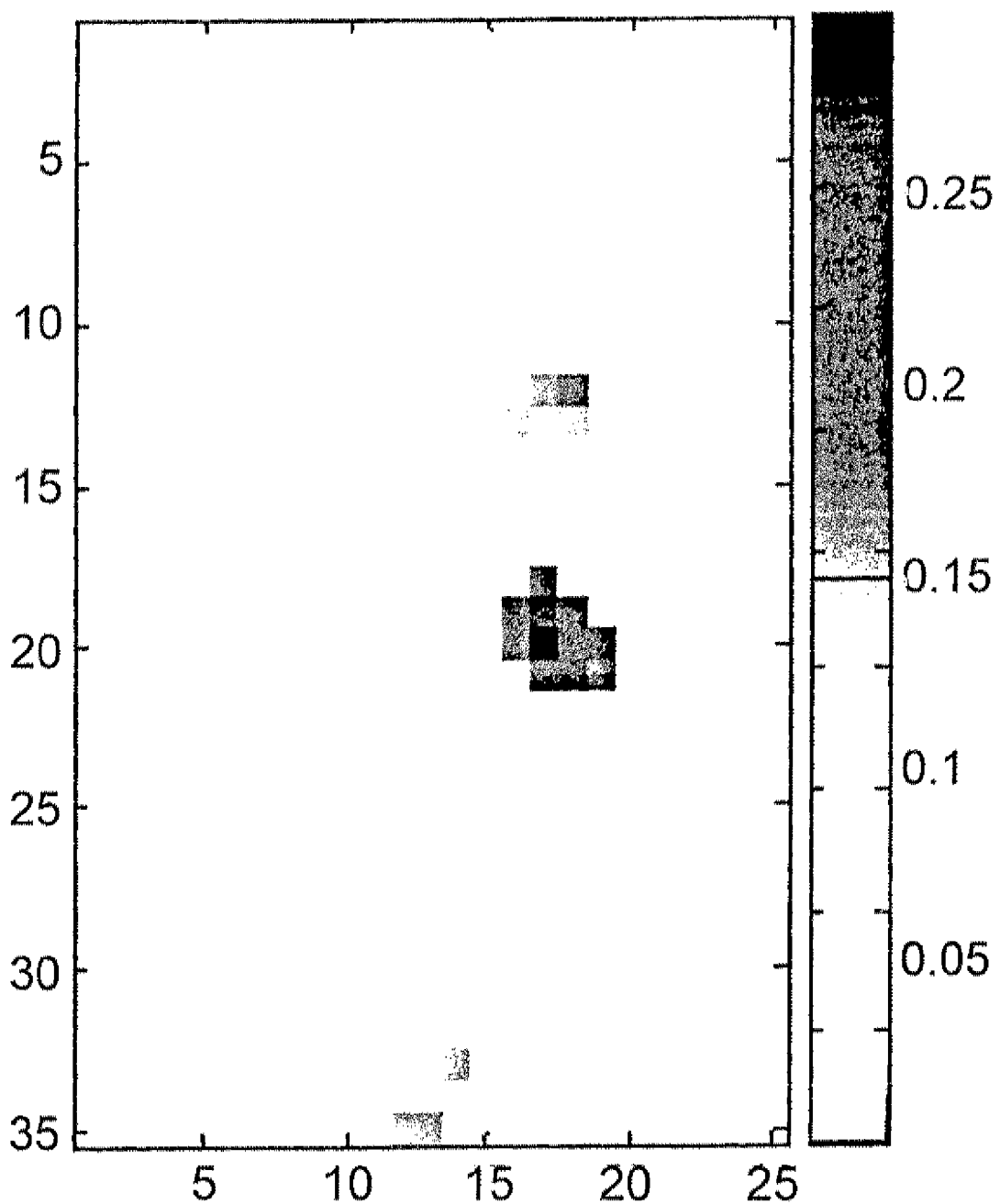
FIG. 18 illustrates the average of the correlation maxima of FIG. 17.

FIGS. 15 to 18 illustrate the experimental results for two impacts with an amplitude ratio of 1/10 in the experimental setup as described above for the first and second embodiment FIG. 15 illustrates the correlation maxima obtained by correlating the sensed signals of the 28 possible sensor couples (not taking into account permutations and autocorrelations of the sensors) and for corresponding couples of reference signals $R_{im}R_{i'm}*$. FIG. 16 then again shows the average value of the correlation products shown in FIG. 15 wherein averaging is carried out in the time domain to improve the contrast. Like in the first embodiment the maximum value of the correlation maxima of the sensor couples points towards the location x of the strongest impact. In this example the position of the strongest is in the upper right part of the interaction plate 3.

This actually corresponds to an alternative way of determining the location of the strongest impact (Step S1). The difference with respect to Step S1 of the first embodiment is that instead of using the correlation of the sensed signal from one sensor with all the reference signals, here in embodiment 3 correlations are determined for couples of sensors and couples of reference signals. In fact, the use of couples improves the resolution and removes the effect of the excitation functions of the two impacts.

Now carrying out the above-described method steps s2_20 to S3_25 on the sensed signals and using the information about the strongest impact, one obtains the results illustrated in FIGS. 17 and 18.

FIG. 17 shows the maxima of the correlation products of the 28 sensor couples and the corresponding reference signal couples based on the modified signals obtained at the end of step S3_25. FIG. 18 again illustrates the average value over the 28 couples wherein averaging is again carried out in the time domain to improve contrast. Whereas FIG. 16 clearly only indicated one impact on the upper right side of the interface plate 3, FIG. 18 shows, for an amplitude ratio of 1/10, the position of the second impact below the position of the first one.

Like in the first embodiment the same kind of result can be obtained over a large range of amplitude ratios, e.g. the second impact can be localised for an amplitude ration going from 1/100 up to 1.

It is important to mention that even though embodiments 1 to 3 have been described with examples of two simultaneous impacts, all embodiments can also be adapted to determine more than two simultaneous impacts. This is realized by each time taking the modified signal $S_i'$ as starting point to determine the location of the next weaker impact.

Of course, the various steps of the methods according to first to third embodiment can also be combined and/or exchanged depending on the available computing power and the needed resolution in time and space. In particular, the step of determining the location of the strongest impact starting from the sensed signal can be based on the correlation $S_iR_{im}$ or on the correlation of couples $S_iS_i*R_{im}*R_{i'm}$ (Step S1). Also in case of the determination of the location of the weaker impact, the localization of the corresponding position can be based on the correlation $S_iR_{im}$ (like in embodiment 1) or on the correlation of couples $S_iS_i*R_{im}*R_{i'm}$ (like described in the third embodiment).

The fourth embodiment of the disclosure takes advantage of the above-described first to third embodiments and, in particular, the second and third embodiment where the resolution in time is improved with respect to differences in the form of the excitation of a user impact and the reference impacts, to identify the trajectory of a continuous impact on a surface. In this embodiment the impacts are thus not simultaneous but the trajectory, like the sliding of a finger on the interface plate 3, is interpreted a successive excitations with a sampling rate of 10 Hz to 100 Hz. When applying the disclosed embodiments to tracking applications, a series of locations on the trajectory is determined by considering the "older" location as the weaker one and the more recent position on the trajectory as the stronger one. The actual trajectory which is a continuous curve, is obtained using adapted spatial filers, like for example a Kalman filter.

The embodiments have been described for applications using acoustic sensors. Nevertheless, the disclosed methods can also be applied to other kinds of sensors without departing from the scope of the disclosure.

The disclosed methods described above (embodiments 1-4) find their application in any devices needing a man-machine interface and have the advantage that the locations of simultaneous or quasi simultaneous (like in embodiment 4) impacts can be determined in a reliable manner without needing too heavy calculation power. This is due to the fact that once the strongest impact has been localized, a modified sensed signal is determined which takes advantage of the convolution properties of the sensed signals and predetermined reference signals.

We claim:

1. Method for determining the locations of at least two impacts $F_1$ and $F_2$ on a surface using one or more sensors $S_i$, i=1 to n, with n being the number of sensors, the impacts $F_1$ and $F_2$ generating a signal being sensed by the one or more sensors, wherein each sensor provides a sensed signal $s_i(t)$, i=1 to n, with n being the number of sensors; and comprising:
   a) identifying the location x of one impact, and
   b) determining a modified sensed signal $s_i'(t)$ for each sensor in which the contribution due to the identified impact is reduced and which is based on a comparison of each of the sensed signals $s_i(t)$ and a predetermined reference signal $r_{ij}(t)$ corresponding to a reference impact $R_j$ at a reference location j.

2. Method according to claim 1, wherein the locations of the at least two impacts on the surface define a trajectory of a continuous impact on the surface.

3. Method according to claim 2, wherein the first and second impact correspond to successive positions on the trajectory.

4. Method according to claim 1, wherein the sensor is an acoustic sensor.

5. Method according to claim 1, wherein identifying the location x of one impact is of the strongest impact.

6. Method according to claim 5, wherein the comparison is a correlation.

7. Method according to claim 6 wherein b) comprises:
   b1) correlating each of the sensed signals $s_i(t)$ with the reference signal $r_{ix}(t)$, which is the reference signal, out of a plurality of reference signals $r_{ij}(t)$ corresponding to a series of reference impacts provided at a certain number of reference positions $R_j$, which corresponds to a reference impact in the vicinity of the location x of a strongest impact,
b2) fitting each correlation product with a predetermined function and
b3) subtracting the fitted function from the correlation product.

8. Method according to claim 7, wherein the correlating of each of the sensed signals $s_i(t)$ with the reference signal $r_{ix}(t)$ is performed by using the Fourier transform $S_i(\omega)$ of the sensed signal $s_i(t)$ and the Fourier transform $R_{ix}(\omega)$ of the reference signal $r_{ix}(t)$.

9. Method according to claim 8, wherein b) further comprises, multiplying the results obtained with the Fourier transform $R_{ix}(\omega)$ of the reference signal $r_{ix}(t)$ to thereby obtain a modified Fourier transform $S_i'(\omega)$ corresponding to a modified sensed signal $s_i'(t)$.

10. Method according to claim 9, and further comprising c) identifying the location of the next weaker second impact using the modified sensed signals $s_i'(t)$ or its Fourier transform $S_i'(\omega)$, wherein c) comprises:
determining the correlations of the modified sensed signals $s_i'(t)$ of each sensor with each reference signal $r_{ij}(t)$, and averaging the correlation products over the sensors for each reference signal $r_{ij}(t)$.

11. Method according to claim 10, wherein a) to c) are repeated to identify the location of the next weaker impact, wherein in each time in a) the location of the impact which has been identified in the previous run is taken as strongest location x and in b) a new modified sensed signal is determined out of the determined modified sensed signal of the previous run.

12. Method according to claim 10, wherein determining the correlation is performed by using the Fourier transforms $S_i'(\omega)$ and $R_{ij}(\omega)$.

13. Method according to claim 10, wherein averaging the correlation product is performed in the time domain.

14. Method according to claim 7, wherein the reference impact is closest to the location x of the strongest impact.

15. Method according to claim 7, wherein the predetermined function is a complex exponential function.

16. Method according to claim 6, wherein b) comprises:
b1) correlating each of the Fourier transforms $S_i(\omega)$ of the sensed signals $s_i(t)$ with the Fourier transform $R_{ix}(\omega)$ of the reference signal $r_{ix}(t)$, which is the reference signal, out of a plurality of reference signals $r_{ij}(t)$ corresponding to a series of reference impacts provided at a certain number of reference positions $R_j$, which corresponds to a reference impact in the vicinity of the location x of a strongest impact, thereby obtaining n correlation products $S_i(\omega)\_R_{ix}^*(\omega)$, with $R_{ix}^*(\omega)$ being the complex conjugate of the Fourier transform $R_{ix}(\omega)$,
b2) averaging the correlation products $S_i(\omega)\_R_{ix}^*(\omega)$ over the n sensors,
b3) determining the phase of the average of the n correlation products $S_i(\omega)\_R_{ix}^*(\omega)$,
b4) multiplying each of the correlation products $S_i(\omega)\_R_{ix}^*(\omega)$ with the complex conjugate of the phase of the average to thereby obtain modified correlation products,
b5) subtracting the real part from the modified correlation products, and
b6) multiplying each of the remaining part of the modified correlation products with the phase of the average.

17. Method according to claim 16, wherein the reference signal is closest to the location x of the strongest impact.

18. A method for determining the locations of at least two impacts $F_1$ and $F_2$ on a surface using one or more sensors $S_i$, i=1 to n, with n being the number of sensors, and the impacts $F_1$ and $F_2$ generating a signal being sensed by the one or more sensors, wherein each sensor provides a sensed signal $s_i(t)$, i=1 to n, with n being the number of sensors and comprising:
a) identifying the location x of one impact, and
b) determining a modified signal based on the sensed signal $s_i(t)$ in which the contribution of the identified impact is reduced and which is furthermore based on a comparison of pairs of sensed signals $s_i(t)$ and $s_{i'}(t)$ and pairs of corresponding predetermined reference signals $r_{ij}(t)$ and $r_{i'j}(t)$ corresponding to a reference impact $R_j$ at a reference location i.

19. Method according to claim 18, wherein identifying the location x of one impact is of the strongest impact.

20. Method according to claim 19, and wherein the comparison is a correlation.

21. Method according to claim 20, wherein b) comprises:
b1) correlating the Fourier transforms $S_i(\omega)$ and $S_{i'}(\omega)$ of two sensed signals $s_i(t)$ and $s_{i'}(t)$ thereby obtaining a first correlation product $S_i(\omega)\_S_{i'}^*(\omega)$, with $S_{i'}^*(\omega)$ being the complex conjugate of the Fourier transform $S_{i'}(\omega)$,
b2) correlating the Fourier transforms $R_{ix}(\omega)$ and $R_{i'x}(\omega)$ of the corresponding reference signals $r_{ix}(t)$ and $r_{i'x}(t)$, $r_{ix}(t)$ and $r_{i'x}(t)$ being the reference signals which correspond to a reference impact in the vicinity of the strongest impact x, thereby obtaining a second correlation product $R_{ix}^*(\omega) R_{i'x}(\omega)$ with $R_{ix}^*(\omega)$ being the complex conjugate of the Fourier transform $R_{ix}(\omega)$,
b3) correlating the first and second correlation products to obtain a third correlation product $S_i(\omega) S_i'^*(\omega) R_{ix}^*(\omega) R_{ix}'(\omega)$,
b4) averaging the real part of the third correlation product over all pairs of sensor couples and subtracting this average from the third correlation products to obtain $P_{ii'x}(\omega)$.

22. Method according to claim 21, further comprising c) identifying the location of the next weaker second impact, comprising:
multiplying $P_{ii'x}(\omega)$ with the sum of $R_{ix}(\omega) R_{im}^*(\omega)+\_R_{i'x}^*(\omega) R_{i'm}(\omega)$ for all reference impacts $R_m$, m=1 to P, with P being the number of reference impacts at reference locations m, and for all sensor couples $S_i$ and $S_{i'}$, with $R_{im}(\omega)$ and $R_{i'm}(\omega)$ being the Fourier transforms of reference signal $r_{im}(t)$ and $r_{i'm}(t)$, and $R_{im}^*(\omega)$ and $R_{i'x}^*(\omega)$ being the complex conjugates of Fourier transforms $R_{im}(\omega)+R_{i'x}(\omega)$,
Fourier transforming each one of the products, and
summing the negative time part to the positive time part of each Fourier transform.

23. Method according to claim 22, wherein c) further comprises averaging the obtained sums for all sensor couples $S_i$ and $S_{i'}$.

24. Method according to claim 23, wherein the averaging of the obtained sums is performed in the time domain.

25. Method according to claim 21, wherein in the vicinity of the strongest impact is closest to the location x of the strongest impact.

26. Method according to claim 25, wherein a) to c) are repeated to identify the location of the next weaker impact, wherein each time in a) the location of the impact which has been identified in c) of the previous run is taken as strongest location x and in b) a new modified signal is determined out of the determined modified signal of the previous run.

27. Method according to claim 21, wherein a) comprises correlating the Fourier transforms $S_i(\omega)$ and $S_{i'}(\omega)$ of two sensed signals $s_i(t)$ and $s_{i'}(t)$ thereby obtaining the first correlation product $S_i(\omega) S_{i'}(\omega)^*$, correlating the Fourier transforms $R_{im}$ and $R_{i'm}(\omega)$ of two corresponding reference signals $r_{im}(t)$ and $r_{i'm}(t)$, m=1 to P, with P being the number of reference impacts at reference locations m, thereby obtaining second correlation products $R_{im}*(\omega) R_{i'm}(\omega)$, $R_{im}*(\omega)$ being the complex conjugate of Fourier transform $R_{im}(\omega)$, correlating the first and second correlation products to obtain the third correlation product $S_i(\omega) S_i*(\omega) R_{im}*(\omega) R_{i'm}(\omega)$, and averaging the correlation products over the couples of sensors $S_i$ and $S_{i'}$.

28. Method according to claim 27, wherein the averaging of the correlation products is performed in the time domain.

29. Method according to claim 20, wherein a) comprises:
determining the correlations of the sensed signal $s_i(t)$ of each sensor with each reference signal $r_{ij}(t)$, and
averaging the correlation products over the sensors for each reference signal $r_{ij}(t)$.

30. Method according to claim 29, wherein determining the correlations is performed using the Fourier transforms $S_i(\omega)$ and $R_{ij}(\omega)$.

31. Method according to claim 29, wherein the averaging of the correlation products is performed in the time domain.

32. Method according to claim 18, wherein the locations of the at least two impacts on the surface define a trajectory of a continuous impact on the surface.

33. Method according to claim 18, wherein the sensor is an acoustic sensor.

34. Computer program product, comprising one or more non-transitory computer readable media having computer-executable instructions adapted to perform the following:
a) identify the location x of one impact, and
b) determine a modified sensed signal $s_i'(t)$, i=1 to n, with n being the number of sensors, for each sensor in which the contribution due to the identified impact is reduced and which is based on a comparison of each of the sensed signals $s_i(t)$ and a predetermined reference signal $r_{ij}(t)$ corresponding to a reference impact $R_j$ at location j.

35. A device for determining the locations of at least two impacts $F_1$ and $F_2$ on a surface comprising:
a processing unit, and
one or more sensors configured and arranged to transmit a sensed signal being the result of the at least two impacts to the processing unit,
wherein the processing unit is configured and arranged to:
a) identify the location x of one impact, and
b) determine a modified sensed signal $s_i'(t)$, i=1 to n, with n being the number of sensors, for each sensor in which the contribution due to the identified impact is reduced and which is based on a comparison of each of the sensed signals $s_i(t)$ and a predetermined reference signal $r_{ij}(t)$ corresponding to a reference impact $R_j$ at location j.

* * * * *